(12) United States Patent
Rohs et al.

(10) Patent No.: US 10,267,392 B2
(45) Date of Patent: Apr. 23, 2019

(54) CONE/FRICTION RING TRANSMISSION AND METHOD FOR A CONE/FRICTION RING TRANSMISSION

(71) Applicant: Ulrich Rohs, Dueren (DE)

(72) Inventors: Ulrich Rohs, Dueren (DE); Christoph Draeger, Langerwehe (DE); Werner Brandwitte, Langerwehe (DE)

(73) Assignee: Ulrich Rohs, Dueren (DE)

( * ) Notice: Subject to any disclaimer, the term of this patent is extended or adjusted under 35 U.S.C. 154(b) by 491 days.

(21) Appl. No.: 15/213,616

(22) Filed: Jul. 19, 2016

(65) Prior Publication Data

US 2016/0327136 A1 Nov. 10, 2016

Related U.S. Application Data

(62) Division of application No. 13/817,010, filed as application No. PCT/DE2011/001597 on Aug. 16, 2011, now abandoned.

(30) Foreign Application Priority Data

Aug. 16, 2010 (DE) .......................... 10 2010 034 502
Jan. 18, 2011 (DE) .......................... 10 2011 008 863

(51) Int. Cl.
*F16H 15/42* (2006.01)
*F16H 61/664* (2006.01)
*F16H 61/26* (2006.01)

(52) U.S. Cl.
CPC ............. *F16H 15/42* (2013.01); *F16H 61/26* (2013.01); *F16H 61/664* (2013.01); *F16H 61/6648* (2013.01); *F16H 61/6649* (2013.01)

(58) Field of Classification Search
CPC ..... F16H 15/42; F16H 61/664; F16H 61/6649
See application file for complete search history.

(56) References Cited

U.S. PATENT DOCUMENTS 1,709,346 A 4/1929 Garrad
1,727,232 A 9/1929 Farrell
(Continued)

FOREIGN PATENT DOCUMENTS

DE 526751 C2 6/1931
DE 100 47 139 A1 5/2001
(Continued)

OTHER PUBLICATIONS

Printout from Wikipedia "Control system" Version Mar. 14, 2016 (total of 8 pages).
(Continued)

*Primary Examiner* — David M Fenstermacher
(74) *Attorney, Agent, or Firm* — Collard & Roe, P.C.

(57) ABSTRACT

In order for it to be also possible to transmit relatively high torques in an operationally reliable manner with low power loss and with a low or inexpensive design outlay in a bevel friction ring gear mechanism, consisting of at least two component transmissions which are configured as bevel friction ring gear mechanisms and have a first adjusting device for a friction ring of the first component transmission and a second adjusting device for a friction ring of the second component transmission, wherein the bevel friction ring gear mechanism has a regulating device for regulating an axial position of the friction rings, it is proposed that the regulating device has at least one first part regulating device with a first reference variable and a second part regulating device with a second reference variable which is separate from the first reference variable, wherein the first component transmission has the first part regulating device for regulating the position of the friction ring of the first component transmission, and the second component transmission has the first part regulating device and the second part regulating device, but at least the second part regulating device, for
(Continued)

regulating the position of the friction ring of the second part transmission.

19 Claims, 14 Drawing Sheets

(56) References Cited

U.S. PATENT DOCUMENTS

| | | | |
|---|---|---|---|
| 2,178,859 A | 7/1939 | Jett et al. | |
| 4,882,948 A * | 11/1989 | Byrnes, Jr. | F16H 15/50 475/115 |
| 5,885,185 A | 3/1999 | Kidokoro et al. | |
| 5,924,953 A * | 7/1999 | Rohs | F16H 15/42 476/52 |
| 6,028,304 A | 2/2000 | Bieg et al. | |
| 6,277,048 B1 * | 8/2001 | Rohs | F16H 15/42 476/53 |
| 6,387,009 B1 | 5/2002 | Haka | |
| 7,066,649 B2 | 6/2006 | Nagai et al. | |
| 7,654,930 B2 * | 2/2010 | Rohs | F16H 15/42 476/52 |
| 8,303,462 B2 * | 11/2012 | Rohs | C10M 101/02 476/51 |
| 8,574,110 B2 * | 11/2013 | Hoffman | F16H 37/0853 475/215 |
| 9,316,293 B2 * | 4/2016 | Rohs | F16H 15/42 |
| 9,328,810 B2 * | 5/2016 | Raney | F16H 37/0853 |
| 9,903,471 B2 * | 2/2018 | Cui | F16H 63/065 |
| 9,970,521 B1 * | 5/2018 | Cook | F16H 37/10 |
| 2002/0142883 A1 | 10/2002 | Pavlov et al. | |
| 2005/0164825 A1 * | 7/2005 | Reisch | F16H 15/42 476/52 |

FOREIGN PATENT DOCUMENTS

| | | |
|---|---|---|
| EP | 1528285 A2 | 5/2005 |
| EP | 1 777 441 A1 | 4/2007 |
| JP | 51-114721 C2 | 8/1976 |
| JP | H07-127702 A | 5/1995 |
| JP | H10-89433 A | 4/1998 |
| JP | 2000-291759 A | 10/2000 |
| JP | 2006-250625 A | 9/2006 |
| WO | 2004/033934 A2 | 4/2004 |
| WO | 2004/063598 A1 | 7/2004 |

OTHER PUBLICATIONS

Printout from Wikipedia "Regelkreis" Version Mar. 4, 2016 with translation (total of 2 pages).
International Search Report of PCT/DE2011/001597, dated Apr. 27, 2012.

* cited by examiner

CONE/FRICTION RING TRANSMISSION AND METHOD FOR A CONE/FRICTION RING TRANSMISSION

CROSS REFERENCE TO RELATED APPLICATIONS

This application is a divisional of and Applicant claims priority under 35 U.S.C. §§ 120 and 121 of U.S. application Ser. No. 13/817,010 filed on Feb. 14, 2013, which application is a national stage application under 35 U.S.C. § 371 of PCT Application No. PCT/DE2011/001597 filed on Aug. 16, 2011, which claims priority under 35 U.S.C. § 119 from German Application No. 10 2010 034 502.4 filed on Aug. 16, 2010 and German Application No. 10 2011 008 863.6 filed on Jan. 18, 2011, the disclosures of each of which are hereby incorporated by reference. Certified copies of the priority German Patent Applications are contained in parent U.S. application Ser. No. 13/817,010. The International Application under PCT article 21(2) was not published in English.

BACKGROUND OF THE INVENTION

1. Field of the Invention

The invention relates to a cone/friction ring transmission, consisting of at least two subsidiary transmissions structured as cone/friction ring transmissions, and to a method for a cone/friction ring transmission having at least two subsidiary transmissions structured as cone/friction ring transmissions.

2. The Prior Art

Such a transmission is known from U.S. Pat. No. 1,709,346, whereby in these arrangements, a central cone is driven, which interacts with one or more output cones, by way of a friction ring, in each instance; these output cones are directed opposite the input cones, axis-parallel to them, disposed at a distance from the input cone that is constant over the cone mantle. The friction rings can be displaced along the gap, in each instance, by way of a common frame, so that a translation ratio between the input cone and the output cone can be adjusted in infinitely variable manner. The power take-offs of the power take-off cones, in each instance, are connected with the planets of a planetary gear, so that a torque applied by the input cone is divided up among the power take-off cones, in each instance, and totaled up again by way of the planetary gear, where a constant speed of rotation of the planets as well as of the power take-off cones is forced to occur as the result of coupling of the planets. However, this arrangement contains the problem that even tiny production tolerances or inaccuracies lead to friction losses between the friction rings and the cones.

Another embodiment of a transmission that can be adjusted in infinitely variable manner is known from JP 2000-291759, in which the friction rings are not guided along a gap by way of a common frame. Instead, each friction ring of each subsidiary transmission has an adjustment device that is mechanically independent of the others, which can be controlled by a common regulation device.

An alternative, known from WO 2004/063598 A1, proposes merging the power take-off cones, in each instance, of two parallel subsidiary transmissions that can be adjusted in infinitely variable manner, by means of a superimposition transmission on the power take-off. The need for equalizing the slip between an input cone and an output cone that occurs as the result of production tolerances or inaccuracies is eliminated, by way of the power-split joining of the power take-off shafts, because a total drive joined in this form allows differences in the speed of rotation between the subsidiary transmissions, in each instance. However, it is a disadvantage of such an embodiment that the increased complexity of the overall transmission and the increased number of friction pairings in the subsequent superimposition transmissions increase not only the production, assembly, and maintenance costs, but also the failure likelihood and the loss in degree of effectiveness.

SUMMARY OF THE INVENTION

It is therefore the task of the present invention to make available a transmission of the type stated, which can be adjusted in infinitely variable manner, which can also transfer higher torques, in operationally reliable manner, with little power loss, and at low or cost-advantageous construction expenditure.

As a solution, the invention proposes a cone/friction ring transmission having at least two subsidiary transmissions structured as cone/friction ring transmissions, which have a first adjustment device for a friction ring of the first subsidiary transmission, and a second adjustment device for a friction ring of the second subsidiary transmission, whereby the cone/friction ring transmission has a regulation device for regulation of an axial position of the friction rings, and is characterized in that the regulation device has at least a first subsidiary regulation device having a first reference variable, and a second subsidiary regulation device having a second reference variable, which is separate from the first reference variable, whereby the first subsidiary transmission has the first subsidiary regulation device for regulation of the position of the friction ring of the first subsidiary transmission, and the second subsidiary transmission has at least the second subsidiary regulation device for regulation of the position of the friction ring of the second subsidiary transmission.

The use of regulation by means of a second subsidiary regulation device and a second reference variable separate from the first reference variable has the advantage that regulation of the position of the friction ring of the second subsidiary transmission, independent of production tolerances or inaccuracies, can take place. A regulation device that makes the desired translation ratio of the transmission available by means of a control variable that is identical for both subsidiary transmissions, according to the state of the art, cannot be able to take the wear behavior in the two subsidiary transmissions into consideration in targeted manner, because the compulsory sameness of the speed of rotation of the two subsidiary transmissions can lead to increased slip in at least one of the subsidiary transmissions, or necessarily leads to an increased or undefined slip because of the unavoidable production tolerances. Only by means of regulation of the friction ring of the second subsidiary transmission that is independent of the first subsidiary regulation device can differences in speed of rotation between the friction rings of the two subsidiary transmissions be equalized, so that the transfer of force in the two subsidiary transmissions takes place with little slip, if at all possible, or with precisely defined slip between the friction rings, in each instance, and the cones that are connected to interact by means of these friction rings.

It is also possible that a regulation device is implemented within an engine or transmission control device that is present, in any case, which device takes on all or most of the relevant control and regulation procedures in modern motor vehicles. In this regard, it is understood that—particularly in distinction from JP 2000-291759—such an engine or transmission control device that is present, in any case, can be implemented with a regulating effect by means of inclusion in the regulation circuit described above.

According to a preferred embodiment of the present invention, the translation of the first subsidiary transmission can be regulated by means of a first subsidiary regulation device, which corresponds to a regulation device according to the state of the art, whereby, for example, the reference variable is a translation ratio predetermined by a characteristic field or a translation ratio otherwise predetermined by a control device.

In order to implement the advantage of speed-of-rotation-synchronous friction rings in particularly simple and operationally reliable manner, it is proposed that a regulation variable of the first subsidiary regulation device is a reference variable of the second subsidiary regulation device.

A regulation variable of the first subsidiary transmission used according to this aspect of the invention can be, for example, the speed of rotation of the friction ring of the first subsidiary transmission or the speed-of-rotation slip at the friction ring of the first subsidiary transmission, or a torque transferred by way of the first subsidiary transmission. The regulation variable of the first subsidiary transmission that is used is consequently linked with the second subsidiary regulation device in such a manner that the regulation variable of the first subsidiary transmission is a reference variable of the second subsidiary regulation device, and that a regulation variable of the second subsidiary regulation device, of the same type, in terms of value, as the regulation variable of the first subsidiary regulation device, is regulated to a corresponding value.

Alternatively or cumulatively to this, the reference variable of the first subsidiary regulation device can also be a reference variable of the second subsidiary regulation device.

A reference variable preset by a control device, for example a transmission translation or a position of a friction ring of the first subsidiary transmission, but also an angular position of the first friction ring, can therefore also be used for regulation of the position of the friction ring of the second subsidiary transmission.

This has the advantage that regulation of a friction ring of the second subsidiary transmission, at high required adjustment speeds, can follow the regulation of a friction ring of the first subsidiary transmission at sufficiently great accuracy or speed, because adjustment of the regulation variable of the second subsidiary transmission by way of the reference variable of the first subsidiary transmission can be used as preliminary regulation, and the second subsidiary regulation device merely has to readjust the position of the friction ring of the second subsidiary transmission, if necessary, by a small amount relative to the predetermined position, if the second reference variable of the second subsidiary transmission requires corresponding deviations.

This method of regulation of the position of a friction ring of the second subsidiary transmission, with simultaneous use of the reference variable of the first subsidiary transmission and a second reference variable separate from this reference variable, makes it possible to adjust the position of a friction ring of the second subsidiary transmission synchronous to the position of a friction ring of the first subsidiary transmission, and, if necessary, to balance out any production tolerances or inaccuracies by means of correcting the position of a friction ring of the second subsidiary transmission by way of the second subsidiary regulation device.

Alternatively or cumulatively, transmission control is also possible, by means of which the first subsidiary transmission and the second subsidiary transmission are regulated by way of the reference variable of the first subsidiary transmission, and in which correction of a slip value that is different in value at the friction rings takes place by way of correction of the position of the friction ring of the second subsidiary transmission, in that a position offset characteristic field is used as the reference variable for the second subsidiary regulation device.

In this connection, a data set that is determined during running-in, for example after assembly of a corresponding cone/friction ring transmission and before initial startup of the said cone/friction ring transmission, by means of measurement of same, for example on a test bench, can be used as the position offset characteristic field. A characteristic field determined according to this method can be a two-dimensional diagram, for example, in which a correction variable is stored for every axial position of the friction ring of the second subsidiary transmission that is approached, which variable is necessary to determine the amount of the required axial displacement of the friction ring of the second subsidiary transmission to the position set by the reference variable of the first subsidiary regulation device. Alternatively or cumulatively, such a position offset characteristic field can also be recorded or changed during operation, by means of the existing transmission control device itself, if a device for detecting the slip that is applied to the friction rings is present and the values determined by it are evaluated in suitable manner. It is understood that such a position offset characteristic field can also be made available in various other ways.

In order to implement the aforementioned advantages, it is therefore proposed, within the scope of a preferred alternative, that the reference variable of the second subsidiary regulation device is a reference variable of the first subsidiary regulation device corrected by way of a position offset characteristic field.

In this manner, the regulation process can be significantly simplified and accelerated during normal operation, or can be carried out with less computing effort.

Regulation of friction rings of two subsidiary transmissions, independent of one another or partly independent of one another, furthermore requires that the different friction rings do not exert any kinematic influence on one another. If the different subsidiary transmissions have at common cone and a further cone, in each instance, and the friction rings connect the common cone and the further cone of a subsidiary transmission so as to interact with one another, in each instance, it is advantageous, particularly if all the friction rings are the same parts and are therefore identical in design, that each friction ring of a subsidiary transmission encloses the further cone of this subsidiary transmission.

For an embodiment with two subsidiary transmissions, it is therefore preferably proposed that the first subsidiary transmission and the second subsidiary transmission have a common cone and a further cone, in each instance, that the friction ring of the first subsidiary transmission merely encloses the further cone of the first subsidiary transmission, and that the friction ring of the second subsidiary transmission merely encloses the further cone of the second subsidiary transmission.

In order to advantageously benefit from further symmetry properties and to divide the power transferred by way of the two subsidiary transmissions in equal parts, and then bring these together again, it is proposed to structure the power, force, or torque division and merging at the different subsidiary transmissions or at the further cones of the different subsidiary transmissions in such a manner that the cones are guided on a common shaft, by way of a gear drive, whereby the individual gear wheel pairings of the subsidiary transmissions, in each instance, have an identical translation ratio. It is therefore proposed that the further cone of the first subsidiary transmission is connected to interact with a shaft, by means of a first transmission, particularly a gear wheel transmission, and the further cone of the second subsidiary transmission is also connected to interact with this shaft, by means of a second transmission, particularly a gear wheel transmission, whereby the first and the second transmission have an identical translation ratio.

It is understood that such an arrangement is also possible for a cone/friction ring transmission having more than two subsidiary transmissions, whereby each further subsidiary transmission has a regulation device provided for this subsidiary transmission and independent of the first regulation device.

According to another aspect of the invention, it is desired, within the scope of the aforementioned task, to apply the press-down force required at the cones by means of the use of a device that is as cost-advantageous as possible. For example, a device for applying a press-down force can be provided on the common cone, instead of providing two different devices for applying the press-down force on two or more further cones. This has the advantage that a cost-advantageous transmission with relatively simple regulation of the press-down force, by means of a single unit, can be implemented.

In order to implement this advantage, it is therefore particularly proposed to make available a cone/friction ring transmission consisting of at least two subsidiary transmissions structured as cone/friction ring transmissions, in which the subsidiary transmissions have an input cone and a common: output cone, in each instance, and which is characterized in that the common output cone has a press-down device. Such an arrangement makes it possible to coordinate the press-down device with the different operating states, in particularly precise manner and with a simple construction.

According to another aspect of the invention, it is also possible, as an alternative to a single press-down device for a common cone, to use multiple press-down devices for the further cones. In order to achieve an advantage as compared with an individual press-down device, the possibility exists, in the case of such an arrangement, to keep press-down forces on cones of different subsidiary transmissions the same, in terms of amount. Equalization of different press-down forces can take place, in this connection, by means of suitably coupled press-down devices, for example.

In order to implement this advantage, a cone/friction ring transmission consisting of at least a first subsidiary transmission structured as a cone/friction ring transmission and a second subsidiary transmission structured as a cone/friction ring transmission is proposed, which is characterized in that at least two cones from different subsidiary transmissions have a press-down device, in each instance, whereby the two press-down devices have a device for equalizing the difference in the press-down forces.

Force equalization performed according to this aspect of the invention can advantageously be implemented, in this connection, by means of a scale, whereby this scale can be a hydraulic scale or a mechanical scale.

A scale that acts hydraulically, between two press-down devices, can be structured, for example, in such a manner that two oil-filled pressure chambers of the press-down device, filled with oil, are connected with one another by means of a line system, in such a manner that hydraulic pressure equalization between the press-down devices takes place.

Accordingly, it is proposed that the force equalization takes place hydraulically.

An alternative scale, which works mechanically, can be structured, for example, by means of a skillful arrangement of levers, whereby preferably, two levers having the same length and connected to interact opposite to one another, to balance out forces between the two press-down devices according to the balance scale principle, are provided. Also, such equalization can take place, for example, by means of pulleys and cables or similar arrangements. In this regard, force equalization can also take place mechanically.

Furthermore, the use of force equalization offers alternative possibilities for applying a press-down force by way of the press-down device. The use of two uncoupled press-down devices, in contrast to this, also requires separate application of the press-down forces. Coupling of two press-down devices as described above therefore allows applying the required press-down forces by means of a single device common to both press-down devices.

Therefore the only requirement, when using hydraulic force equalization, is to use a single device, such as a pump, for applying the press-down force.

For mechanical force equalization that works according to the balance scale principle, a skillful arrangement of devices for applying a press-down force, such as a spring package, is also a possibility, whereby such a spring package or other type of device for applying a press-down force only has to be provided either in a press-down device, or can be provided at the pivot point of the lever mechanism of the mechanical force equalization device.

A previously proposed possibility of using a second subsidiary regulation device for a second subsidiary transmission consists in using a speed of rotation of a friction ring as a regulation variable of a regulation segment. It is therefore proposed to make available a cone/friction ring transmission consisting of at least one input cone and one output cone, and a friction ring disposed between the input cone and the output cone, enclosing at least one cone, which is characterized by a device for measuring the speed of rotation of the friction ring.

In this connection, measuring the speed of rotation of the friction ring means a direct measurement of the physical speed of rotation of the friction ring that is actually present. It is therefore proposed that the device for measuring the speed of rotation of the friction ring preferably detects the speed of rotation of the friction ring directly at the friction ring, preferably by means of a sensor system that acts on the friction ring. In this connection, "direct measurement of the speed of rotation" is understood to mean measurement of the speed of rotation that does not take place by means of modules that are acted on by a main torque that passes through the corresponding subsidiary transmission and corresponds to the torque that acts on the input cone of the subsidiary transmission, in each instance. For example, the measurement can be undertaken by means of a sensor system that engages directly on the friction ring, for example by means of an inductive measurement or by means of an optical measurement, if the friction ring has corresponding devices, such as, for example, corresponding teeth or recesses. On the other hand, a corresponding measurement can be carried out by way of a friction ring guide and the guide wheels that engage directly on the friction ring, for example.

Alternatively, an indirect determination of the speed of rotation of the friction ring is also possible, in which the speed of rotation of the cones that are connected to interact, by means of the friction ring, is detected, and the physical speed of rotation of the friction ring is detected by way of physical and/or mathematical models. In this connection, however, it is very difficult to include slip, which might occur differently in the output cone and the input cone, in these models.

Because the friction ring is freely movable in its axial position, it is then otherwise generally necessary to also dispose a measurement device in axially displaceable manner for a direct measurement of the speed of rotation of the friction ring, so that the measurement device assumes a non-changeable position relative to the friction ring. Therefore a guide device that is axially displaceable with the friction ring is proposed, on which the measurement device is disposed.

Alternative to regulation of the axial position of the friction rings by means of the speed of rotation of the friction rings, regulation by means of the slip of the friction rings can also take place, for example. For determining slip on a friction ring or on a friction cone, however, it is advantageous to know not just the speed of rotation of a friction ring, but also at least one further speed of rotation of one of the cones connected, so as to interact, by means of the friction ring. In order to implement this, the cone/friction ring transmission can have not only the device for measuring the speed of rotation of the friction ring, but also a device for measuring the speed of rotation of at least one cone.

In this connection, it is understood that a cone/friction ring transmission having a device for measuring the speed of rotation of the friction ring, particularly if this detects the speed of rotation directly on the friction ring, as well as a cone/friction ring transmission having a device for measuring the speed of rotation of at least one of the cones are correspondingly advantageous, even independent of the other characteristics of the present invention.

Likewise, torque can also be used as the regulation variable for a cone/friction ring transmission, particularly as the regulation variable for a second subsidiary regulation device of a second subsidiary transmission, in other words for an overall transmission that comprises two cone/friction ring transmissions. Accordingly, independent of the other characteristics of the present invention, a cone/friction ring transmission consisting of at least one input cone and one output cone and a friction ring disposed between the input cone and the output cone, enclosing at least one cone, which is characterized by a torque measurement device, is advantageous.

If the torque measurement device comprises contact-free data transmission, then influences of the torque measurement device on the cone/friction ring transmission itself can be minimized; likewise, wear can be restricted to a minimum. In particular, optical and/or inductive data transmission is possible for contact-free data transmission. Likewise, the modules of the torque measurement device that rotate and require energy can be supplied with energy in contact-free manner, for example optically or inductively.

In the present connection, the term data transmission comprises all data or measurement values, whether analog or digital, which provide information about the torque or stand in proportionality to the applied torque. Thus, these can be measurement values that are already digitalized, which are supposed to be transferred from the rotating modules of the torque measurement device to fixed modules. Likewise, these can be measurement signals that still require further processing.

Preferably, the torque measurement device comprises a cone shaft, in other words a shaft that is connected with one of the cones as a drive shaft or power take-off shaft. In particular, the torque measurement device can have a module that is connected in one piece with the cone. Likewise, the measuring modules can be connected with the cone in rigid and at most bending-elastic manner, so that the torque measurement device, although it can be installed and removed, can measure the torque applied to the cone/friction ring transmission or to the corresponding cone directly, if at all possible.

Preferably, a corresponding torque measurement device is provided both on the input cone and on the output cone, whereby a statement concerning the slip of the friction ring can also be made by means of the difference in the torques.

In order to accomplish the task stated initially, alternatively or cumulatively to the above characteristics, a cone/friction ring transmission consisting of at least one input cone as well as one output cone and a friction ring disposed between the input cone and the output cone, enclosing at least one cone, is proposed, which is characterized in that a torque converter is disposed between an input shaft of the cone/friction ring transmission and the input cone. In particular, this torque converter can be used for a cone/friction ring transmission, in such a manner that the input cone has a lower torque than the input shaft. In this way, a cone/friction ring transmission is advantageously made available, which can transfer significantly greater drive power by means of the torque conversion on the input side. This is due to the properties of a cone/friction ring transmission, which transfer torques only by way of force fit, in other words friction, and therefore has a maximal torque that can be transferred. The conversion of this torque into a lower torque, while simultaneously increasing the speed of rotation at the input cone, leads, as is immediately evident, to the increase in the maximal force that can be transferred, as described above, if now twice the original torque, for example, is introduced into a transmission with unchanged dimensioning.

In a particularly advantageous embodiment, the input cone can have approximately half the torque of the input shaft. Consequently, a torque and speed of rotation translation at a translation ratio of about $i=0.5$ is implemented. It has been shown that in terms of design, this translation ratio is particularly well suited for making available a cone/friction ring transmission for higher torques, without having to accept disadvantages, for example caused by greater friction.

In a further particularly advantageous embodiment, and in order to keep additional friction at the cone/friction ring transmission to a minimum, the torque converter can comprise a gear-wheel transmission. Furthermore, a gear-wheel transmission can be produced in particularly cost-advantageous manner, and therefore the advantages that result are not or insignificantly cancelled out by higher costs.

For a cone/friction ring transmission with a gear-wheel transmission, it is furthermore advantageous if an input-side gear wheel of the gear-wheel transmission has an even number of teeth, and an output-side gear wheel of the gear-wheel transmission has an odd number of teeth. This embodiment can also be advantageous for a cone/friction ring transmission vice versa, in that the input-side gear wheel of the gear-wheel transmission has an odd number of teeth, and the output-side gear wheel of the gear-wheel transmission has an even number of teeth. This pairing of two gear wheels, having an even and an odd number of teeth, in each instance, leads to the result that after one circulation of the gear wheel, in each instance, a tooth at first comes into engagement with a different tooth of the opposite gear wheel. In this way, it is prevented that a tooth of one gear wheel exclusively comes into engagement with one and the same tooth of the opposite gear wheel, and therefore non-uniform wear of the gear wheels might be brought about.

In this connection, it is immediately evident that the term "approximately" in connection, with half the torque of the input shaft is aimed at the meaning that a gear wheel of the input shaft has twice the number of teeth of the gear wheel of the input cone, plus or minus one tooth.

Furthermore, a method for a cone/friction ring transmission or for operation of a cone/friction ring transmission consisting of at least one input cone as well as one output cone and a friction ring disposed between the input cone as well as the output cone, enclosing at least one cone, is proposed, which is characterized in that a torque of the input cone is converted to a lower torque, with reference to an input shaft of the cone/friction ring transmission. Therefore, as has already been explained above, the incoming torque is reduced, by means of the torque converter used ahead of the cone/friction ring transmission or ahead of the input cone of the cone/friction ring transmission, while simultaneously increasing the speed of rotation, to such an extent that significantly greater power can be transferred by the cone/friction ring transmission.

In addition to the method explained above, the torque of the input cone can be converted to approximately half the torque of the input shaft, making use of the advantages already explained above.

It is understood that the characteristics concerning torque conversion between the input shaft and the input cone are advantageous for a cone/friction ring transmission even independent of the other characteristics of the invention.

Also, as a further solution of the task stated above, a method is proposed for a cone/friction ring transmission having at least two subsidiary transmissions structured as cone/friction ring transmissions, which have a first adjustment device for a friction ring of the first subsidiary transmission and a second adjustment device for a friction ring of the second subsidiary transmission, whereby an axial position of the friction rings is regulated by way of a regulation device, and the cone/friction ring transmission is characterized in that the regulation device has at least a first subsidiary regulation device having a first reference variable and a second subsidiary regulation device having a second reference variable, separate from the first reference variable, whereby the position of the friction ring of the first subsidiary transmission is regulated by way of the first subsidiary regulation device, and the position of the friction ring of the second subsidiary transmission is regulated by way of the second subsidiary regulation device.

A cone/friction ring transmission regulated according to this method can be regulated, in its overall translation, in accordance with the state of the art, by way of a transmission control device that contains the first subsidiary regulation device, whereby the first subsidiary regulation device receives its reference variable by way of the transmission control device itself or by way of an engine control device that is present. The control variable output by the first subsidiary regulation device is used for regulation of the axial position of a friction ring at least of the first subsidiary transmission, but also for regulation of a friction ring of every further subsidiary transmission that is present, particularly for regulation of the friction ring of the second subsidiary transmission.

A regulation variable detected at the first subsidiary transmission can be passed back to the second subsidiary regulation device, and as a result, the second subsidiary regulation device in turn outputs a second control variable for an adjustment device of a friction ring of the second subsidiary transmission. Any desired speed of rotation, for example the speed of rotation of the friction ring, the speed of rotation of a friction cone situated in the subsidiary transmission, a slip that occurs on the friction ring, or also a torque transferred by the subsidiary transmission, can be used as a regulation variable of the first regulation segment, in other words of the first subsidiary transmission. The control variable output by the second subsidiary regulation device can then be used, together with the control variable output by the first subsidiary regulation device, to regulate the axial position of the friction ring of the second subsidiary transmission.

In this connection, superimposition preferably takes place in such a manner that the axial position of the friction ring of the second subsidiary regulation device is set by the first control variable, so that it corresponds or is equivalent to the axial position of the friction ring of the first subsidiary transmission, and that the second control variable, which is superimposed on the first control variable, only slightly readjusts the friction ring of the second subsidiary transmission, in terms of its position, in such a manner that because of this slight relative change in position of the friction ring of the second subsidiary transmission, the regulation variables of the first subsidiary transmission and of the second subsidiary transmission reach the same value, in other words the regulation deviation of the second regulation variable from the first regulation variable, which is used as the second reference variable, approaches zero. Of course, the position of the friction, ring of the second subsidiary transmission can be regulated not just slightly by means of the control variable of the second subsidiary regulation device, but rather also in such a manner that it is possible to do without the first subsidiary regulation device for positioning of the friction ring of the second subsidiary transmission, and regulation of its position then takes place only by way of the second subsidiary regulation device.

In order to improve a cone/friction ring transmission according to another aspect of the present invention, a method is proposed for a cone/friction ring transmission having at least two subsidiary transmissions structured as cone/friction ring transmissions, which has a first adjustment device for a friction ring of the first subsidiary transmission and a second adjustment device for a friction ring of the second subsidiary transmission, wherein an axial position of the friction rings is regulated by way of a regulation device, which cone/friction ring transmission is characterized in that the regulation device has at least a first subsidiary regulation device having a first reference variable and a second subsidiary regulation device having a second reference variable, dependent on the first reference variable, whereby the second reference variable is generated by way of correction of the first reference variable by way of a position offset characteristic field, and the position offset characteristic field is generated by means of a calibration measurement of deviations in the axial position of the first and of the second friction ring.

A cone/friction ring transmission operated according to this method presumes that the position offset characteristic field that is used is either already present or is recorded during operation of the cone/friction ring transmission.

To generate a position offset characteristic field that has already been stored in the control device of the transmission, for operation of the regulation device, a testing and running-in program for determining the position offset characteristic field can advantageously be used, carried out on a test bench after assembly. In this connection, the production tolerances and inaccuracies are recorded, for example by means of measurement instruments present on the test bench, and permanently stored in the control device of the cone/friction ring transmission, thereby making it possible to do without additional sensors for determining the regulation variables required for regulation. The position offset characteristic field consists, in this test bench calibration, for example of a position of the friction ring of the first subsidiary transmission predetermined by the first regulation device, and a position deviation of the friction ring of the second subsidiary transmission that correlates to it. A corresponding correction variable for the first control variable is determined from this position deviation, and the corrected signal is output by the second subsidiary regulation device as a second control variable.

It is understood that generation of a data set for a position offset characteristic field is not limited to a test bench run before initial startup of the cone/friction ring transmission, because a calibration process is possible also during operation, by means of a transmission control device present in the vehicle and a suitable sensor system on the cone/friction ring transmission. A learning function can be implanted in a control device, according to this method, for example, by means of which function the position offset characteristic field is constantly adapted to the current wear state of the cone/friction ring transmission.

Alternatively or cumulatively to the above embodiments of the invention, a cone/friction ring transmission consisting of a first subsidiary transmission structured as a cone/friction ring transmission and a second subsidiary transmission structured as a cone/friction ring transmission is proposed, in order to accomplish the task stated initially, in which the two subsidiary transmissions have a common cone and the first subsidiary transmission has a first further cone and the second subsidiary transmission has a second further cone, whereby the axes of rotation of the common cone as well as of the two further cones are disposed in an axis plane, whereby at least the common cone has a shaft-side friction cone bearing as well as a shoulder-side friction cone bearing, and whereby the cone/friction ring transmission is characterized in that the shaft-side friction cone bearing and/or the shoulder-side friction cone bearing has a degree of freedom of translation along the axis plane. If a press-down device is provided only for the common cone in a cone/friction ring transmission, the torque transferred by the two subsidiary transmissions can be distributed to the two subsidiary transmissions in particularly uniform manner, by means of the configuration described above, in particularly advantageous manner. In particular, the friction forces and press-down forces that occur at the friction contacts of the two subsidiary transmissions are uniformly distributed to two subsidiary transmissions by means of this configuration. It is also possible, at this point, that the configuration of any desired friction cone bearing or both friction cone bearings with a degree of freedom of translation along the axis plane is advantageous also in the case of a cone/friction ring transmission having two press-down units, whereby the press-down units are provided in the two further cones. In particular, the arrangement explained above is advantageous if only one press-down unit is provided in the further cones.

In this connection, it is understood that roller bearings, in particular, but also slide bearings, if necessary, can be used as friction cone bearings. In particular, four-point bearings, other ball bearings, are suitable as roller bearings, or, in the case of certain bearings, also conical roller bearings; likewise, needle bearings can be used.

For transferring the torque transferred by the cone/friction ring transmission, an individual cone has an input shaft connected with this cone, or an output shaft. The term "shaft-side" therefore characterizes that end of the axial expanse of a cone that faces such an input or output shaft. Accordingly, the term "shoulder-side" refers to the side of the cone that faces away from the corresponding shaft. If a second output shaft or a second input shaft is provided on a cone, for a possible secondary drive, the reference point for the terms "shaft-side" and "shoulder-side" is always the shaft that transfers the main drive torque. In this connection, the term "axial" always refers to the axis of rotation or symmetry of a cone.

The term "degree of freedom of translation" refers to the movement directions of a point or of a body in the coordinate system, independent of one another, in each instance. The present invention here is based on the Cartesian coordinate system, and thus on six degrees of freedom, three degrees of freedom of translation and three degrees of freedom of rotation.

A degree of freedom of translation that runs along the axis plane and essentially radial to the axis of rotation of the common cone therefore describes a movement direction of two axes of rotation, which are moving toward one another or away from one another, or of two points on two axes of rotation, which are moving toward one another or away from one another. In this connection, the term "essentially" expresses that the movement of a friction cone bearing along the axis plane and radial to the axes of rotation does not have to involve only a translational movement of a corresponding bearing in the direction of a further axis of rotation, whereby the axis of rotation of the moving cone moves parallel to the remaining axis of rotation, but rather can also involve movement of the cone axis or bearing axis of rotation about a rotational point on the axis of rotation. Therefore it is true that a point on the moving axis of rotation would always move perpendicular to this axis of rotation, but this movement would not be perpendicular or radial to the axis of rotation toward which the bearing in question is moving.

In order to guarantee drive or power take-off of the common cone that is free of bending force, if this cone is being displaced in the axis plane, a shaft of the common cone can have at least one movable, torsionally rigid coupling. A "movable, torsionally rigid coupling" can be structured, for example, as a universal joint, as a constant velocity ball joint, as a curved-tooth coupling, or as a multiple disk clutch. Essentially, the coupling must balance out an angle and/or an offset of the common cone. Accordingly, it can also be necessary to dispose two movable, torsionally rigid couplings, such as two cardan joints, one behind the other, thereby giving the shaft connected with these couplings a total of four degrees of freedom, two degrees of freedom of rotation and two degrees of freedom of translation. In connection with the degree of freedom of translation of a shaft-side or a shoulder-side friction cone bearing mentioned above, there is therefore a total of one degree of freedom of translation and one degree of freedom of rotation for the entire arrangement or the common cone. This said degree of freedom of translation of the common cone results if both bearings, the shaft-side friction cone bearing and the shoulder-side friction cone bearing, jointly perform a movement along the axis plane. A rotational movement of the common cone results if only one of the two bearings performs a translational movement in the axis plane. In this connection, the term "essentially" becomes clear once again, because a friction cone bearing will move on a circular path if the common cone is immovably clamped on a further friction cone bearing. For the translational movement being considered, however, the angle range represented in such a case is so small that movement on a straight line can be approximated.

Although the angle range being considered during rotational movement of the entire common cone is being considered, it is advantageous for a cone/friction ring transmission if the shaft-side friction cone bearing and the shoulder-side friction cone bearing are structured as floating bearings. In this way, tensions on the basis of movement, but also tensions caused by thermal expansion processes in the common cone or in the shaft can be balanced out. In this regard, it is also advantageous, alternatively to a floating bearing structured on the shaft side and shoulder side, if one of the shaft-side or shoulder-side friction cone bearings is structured as a floating bearing, and the further shaft-side or shoulder-side friction cone bearing is structured as a fixed bearing. In this connection, it is particularly advantageous if the fixed bearing is an angle-movable bearing. An "angle-movable bearing" can particularly be a spherical roller bearing or a self-aligning bearing, which is able to balance out an angle offset of the shaft.

It is furthermore advantageous for a cone/friction ring transmission if the shaft-side and/or the shoulder-side friction cone bearing have a bearing guide. This can be advantageously implemented, in particular, if the bearing is merely used for mounting a rotating axle, and is firmly clamped in the stated bearing guide, and the bearing guide is therefore responsible for translational movement in the axis plane. In this regard, the various bearing tasks are also distributed among different modules.

It can furthermore be advantageous for a cone/friction ring transmission, particularly in connection with a common cone that can move in the axis plane, if at least one friction ring of the cone/friction ring transmission has a contact surface that faces the common cone, whereby the contact surface is configured to be convex relative to a surface of the common cone, at least at a sectional plane that lies in the axis plane. This crowned configuration of a friction ring surface furthermore promotes the slanted position or an angle offset of the axis of rotation of the common cone, in that the same contact geometry between friction ring and common cone is always guaranteed. If the friction ring were to have a level contact surface relative to the common cone, thereby causing a contact line to form at this friction contact instead of a contact point, and furthermore also at the other friction contacts, the surface of the common cone would no longer run parallel to the friction ring surface in the event of an angle offset of the common cone, thereby causing overly strong edge pressures on this friction ring. A surface of the friction ring configured in crowned manner counters this edge pressure and always allows a uniformly structured contact point between the friction ring and the common cone.

It is understood that the characteristics of the above solutions and those described in the claims can also be combined. If necessary, in order to be able to implement the advantages in correspondingly cumulative manner.

BRIEF DESCRIPTION OF THE DRAWINGS

Further advantages, goals, and properties of the present invention will be explained using the following description of the attached drawing. The drawing shows.

DETAILED DESCRIPTION OF THE PREFERRED EMBODIMENTS

Figure 1:
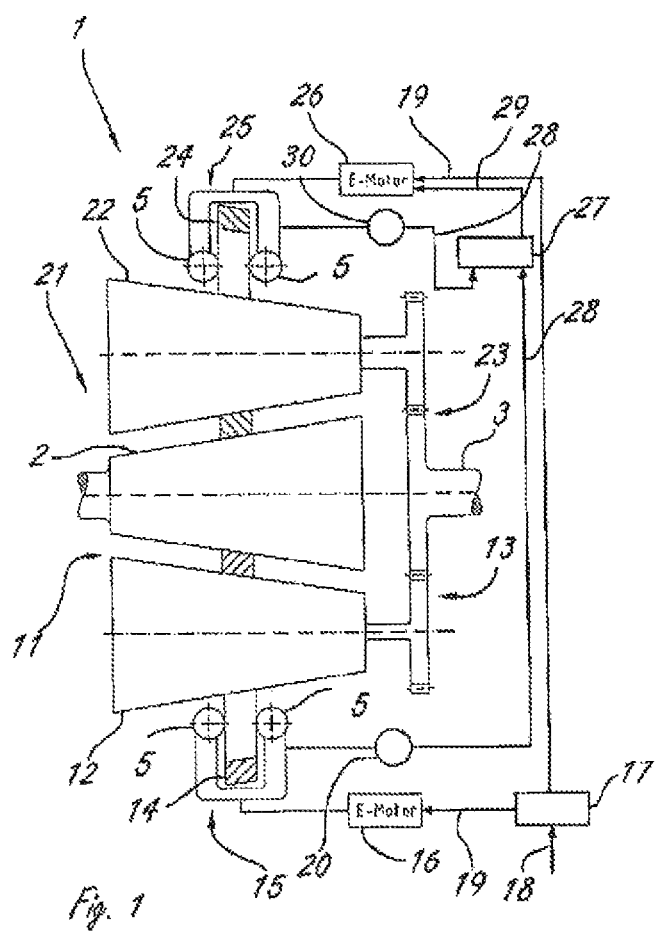
FIG. 1 a cone/friction ring transmission having a first subsidiary transmission and a second subsidiary transmission, as well as a first gear-wheel transmission and a second gear-wheel transmission, which, connects the further cones of the first subsidiary transmission and of the second subsidiary transmission so as to interact with a common shaft, with synchronous speeds of rotation.

FIG. 1 shows the cone/friction ring transmission 1 having a first subsidiary transmission 11 and a second subsidiary transmission 21, as well as a first gear-wheel transmission 13 and a second gear-wheel transmission 23, which connects the further cone of the first subsidiary transmission 12 and the further cone of the second subsidiary transmission 22 with a common shaft, with synchronous speeds of rotation.

The introduction of force into the cone/friction ring transmission 1 takes place, in this embodiment, by way of an input shaft of a common cone 2 of the two subsidiary transmissions 11, 12. The further cones 12, 22 pass the shaft power passed on by the common cone 2 to friction rings 14, 24 on to an output shaft, the common shaft 3. In this connection, the friction rings 14, 24 are axially adjusted by way of adjustment devices 15, 25 having servomotors 16, 26, which are controlled by way of a reference variable 18.

In this embodiment, the output shafts of the further cones 12, 22 are connected with a common spur gear that sits on the common shaft 3, in order to pass the shaft power on by way of two spur gears, in each instance. The power transfer from the common cone 2 to the common shaft 3 is structured in such a manner, because of these two spur gears, that the further cones 12, 22 of the two subsidiary transmissions 11, 21 are always driven at a synchronous speed of rotation, and a difference in the speed of rotation between the further cones 12, 22, caused by a deviation between the axial position of the friction ring 14 of the first subsidiary transmission and the axial position of the friction ring 24 of the second subsidiary transmission cannot be balanced out.

A position deviation between the friction rings 14, 24 therefore also necessarily leads to a difference in the speed of rotation between the friction ring of the first subsidiary transmission 14 and the friction ring of the second subsidiary transmission 24, although this difference in the speed of rotation can also achieve a very small value or, in an idealized, theoretical cone/friction ring transmission, is not present at all. A friction ring operated at a different speed of rotation is subject, as a result, to greater slip at a friction pairing present at this friction ring, such as the friction surface between the surface that lies radially outside of the friction ring and the surface of the common cone 2, or the surface that lies radially within the friction ring and a surface of the further cone connected with the common cone, so as to interact with it, by means of the friction ring.

The second servomotor 26 of the second subsidiary transmission 21, according to this embodiment, uses not only the first reference variable 18, which is used to generate a common control variable 19 for regulation of the two adjustment devices 15, 25, but also a second reference variable 28, which in turn, is formed from the regulation variable of the first subsidiary transmission 11, here the difference in the speeds of rotation of the friction ring of the first subsidiary transmission 14 and of the friction ring of the second subsidiary transmission 24, whereby here, for example, the absolute position of the first friction ring 14 or the like can also be used, for example.

The adjustment devices of the friction rings 15, 25 furthermore include two small guide wheels 5, in each instance, which engage around the friction rings 14, 24 without play, so that on the one hand, axial adjustment of the friction rings 14, 24 can take place without delay, and, on the other hand, the axial position of the friction rings 14, 24 in a stationary state. In other words at a translation ratio that remains the same, can be kept as stable as possible, so that the friction rings are not additionally subject to fluttering or axial migration between the cones 2, 12, 22.

Measurement of the difference in the speed of rotation between the friction rings 14, 24 takes place by way of measurement devices 20, 30 situated on the adjustment devices of the friction rings 14, 24, whereby these measurement devices 20, 30 consist, in this exemplary embodiment, of optical or inductive sensors, not shown, which recognize the friction ring speed of rotation by means of notches or recesses on the friction rings.

The common control variable 19 of a first subsidiary regulation device 17 used for the servomotors 16, 26 of the two adjustment devices 15, 25 is superimposed on the second reference variable 29 of the second subsidiary regulation device 27, for regulation of the axial position of the friction ring of the second subsidiary transmission 21. The first subsidiary regulation device 17 therefore presets the axial position for the friction ring of the second subsidiary transmission 24, as well, whereby it is made possible that the friction ring of the second subsidiary transmission 24 can follow the position of the friction ring of the first subsidiary transmission 14 almost without delay, at high adjustment speeds. Equalization of a relative axial malpositioning of the friction ring of the second subsidiary transmission 24 therefore takes place solely by way of the second subsidiary regulation device 27, so that in this exemplary embodiment, the second subsidiary regulation device 27 is used only for relative positioning, in other words relative to the current position of the friction ring of the second subsidiary transmission 24 itself, and the first subsidiary regulation device 17 is used only for absolute positioning, in other words with reference to a coordinate system fixed on the cone, of the friction ring of the second subsidiary transmission 21.

Regulation of the axial position of the friction ring of the second subsidiary transmission 24 by means of the use of only the second subsidiary regulation device 27 is also possible, without the first reference variable 19 acting on the second servomotor 26 of the adjustment device of the friction ring of the second subsidiary transmission 25.

Figure 2:
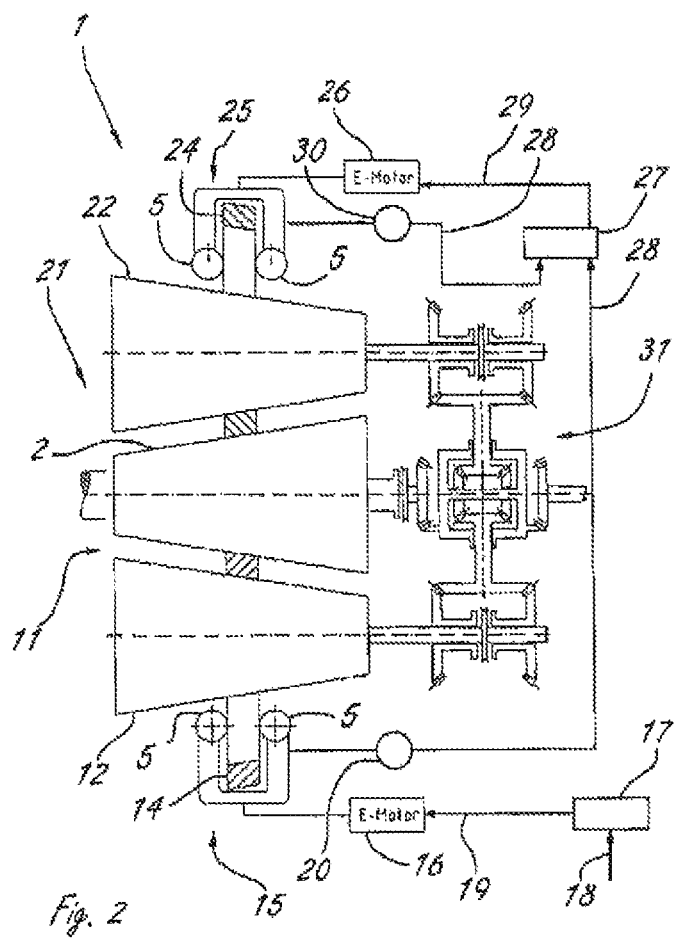
FIG. 2 a cone/friction ring transmission having a first subsidiary transmission, having a second subsidiary transmission, and having a first power-split equalization transmission, which connects the further cones of the first subsidiary transmission and of the second subsidiary transmission so as to interact with a common shaft.

The cone/friction ring transmission 1 shown in FIG. 2, having a first subsidiary transmission 11 and a second subsidiary transmission 21, whereby the first subsidiary transmission 11 has a common cone 2 and a further cone 12, and the second subsidiary transmission 21 has the common cone 2 and a further cone 22, transfers a torque issued by way of the common shaft 3, by means of a first power-split equalization transmission 31. The power-split equalization transmission 31 consists of a differential transmission (not numbered), whereby the coaxial bevel gears are connected with the output shafts of the further cones 12, 22 of the two subsidiary transmissions 11, 21 by way of further switchable bevel gears, and whereby a differential case of the differential transmission is connected to interact with the common shaft 3. An additional bevel gear connected to interact with the differential case of the first power-split equalization transmission 31 can furthermore be connected, in switchable manner, with an output shaft of the common cone 2, so that a direct gear, in other words force transfer at a translation ratio i=1, by way of only a single transmission element, is made possible. The switchable further bevel gears situated at the output shafts of the further cones 12, 22 allow the representation of a reverse gear, by means of the clutch sleeve, which is not numbered.

An equalization transmission 31 configured in this manner, as a differential transmission, is therefore able to permit differences in speed of rotation between the friction rings 14, 24, in that no synchronous speed of rotation between the first subsidiary transmission 11 and the second subsidiary transmission 21 has to be forced to occur. Consequently, a minimum of slip always comes about at the friction rings 14, 24, thereby causing only the further cones 12, 22 to demonstrate a speed of rotation difference between one another. The power-split transmission 31 is able to balance out these speed of rotation differences, and therefore, in turn, relative movements in the differential transmission of the power-split equalization transmission 31 occur instead of increased slip at the friction rings 14, 24, and these relative movements, which balance out the speed of rotation, lead to a reduction in the degree of effectiveness of the transmission, due to friction heat. Regulation of the axial position of the friction rings 14, 24 according to the invention consequently brings about an increase in the degree of effectiveness of the transmission, because of avoidance of these relative movements as explained.

The cone/friction ring transmission 1 having a friction ring 14 of the first subsidiary transmission 11, having a servomotor 16 that belongs to this friction ring 14, as well as an adjustment device 15, having a friction ring 24 of the second subsidiary transmission 21 and having a related servomotor 26, as well as an adjustment device 25, is controlled, in the alternative embodiment shown in FIG. 2, in such a manner that only the servomotor 20 of the adjustment device 15 receives a control variable 19 for regulation of the axial position of the friction ring of the first subsidiary transmission 14 from a first subsidiary regulation device 17, and the second subsidiary regulation device 27 regulates the friction ring of the second subsidiary transmission 24 by way of the second servomotor 30 as well as the second regulation device 25, in terms of its axial position, in such a manner that only the second reference variable 28 is used for generating the second control variable 29. In this embodiment, the reference variable 28 in turn consists of a regulation variable of the first subsidiary transmission 11 made available by the first regulation variable detection 20 and a regulation variable of the second subsidiary transmission 21 made available by the second regulation variable detection 30. In this connection, the reference variable 28 evaluated by the subsidiary regulation device is formed by the difference in the speed of rotation of the friction rings 14, 24, whereby here, too, an axial position of the first friction ring 14, for example, can be used, possibly with the inclusion of a position offset characteristic field, to take a calibration measurement into consideration.

In deviation from the measurement devices of the regulation variable detections 20, 30 described in FIG. 1, in this embodiment a speed of rotation measurement of the friction rings at the small guide wheels 5 of the adjustment devices 15, 25, is provided, in that the speed of rotation of the small guide wheels 5 themselves is detected. It is immediately evident that slip can occur between a small guide wheel 5 and a friction ring, as well, and therefore the measurement of the speed of rotation of the friction ring can be subject to error for this reason, but this is actually very unlikely or can be the case only to an extremely slight degree, because no torque is transferred at this location and the small guide wheels 5 lie very precisely against the friction ring, for secure guidance of the latter, in any case. A correction variable can be superimposed on this measurement variable determined on the small guide wheel, depending on the requirements, depending on the operating state of the cone/friction ring transmission 1, such as stationary operation or an adjustment of the translation ratio in a specific direction. Furthermore, a measurement at the power-split equalization transmission 31 used in this embodiment is also possible, whereby the relative speed of rotation of two transmission elements can be measured, for example, at which the relative speed of rotation or difference in speed of rotation amounts to just zero—as explained further above—during slip-free operation.

Figure 3:
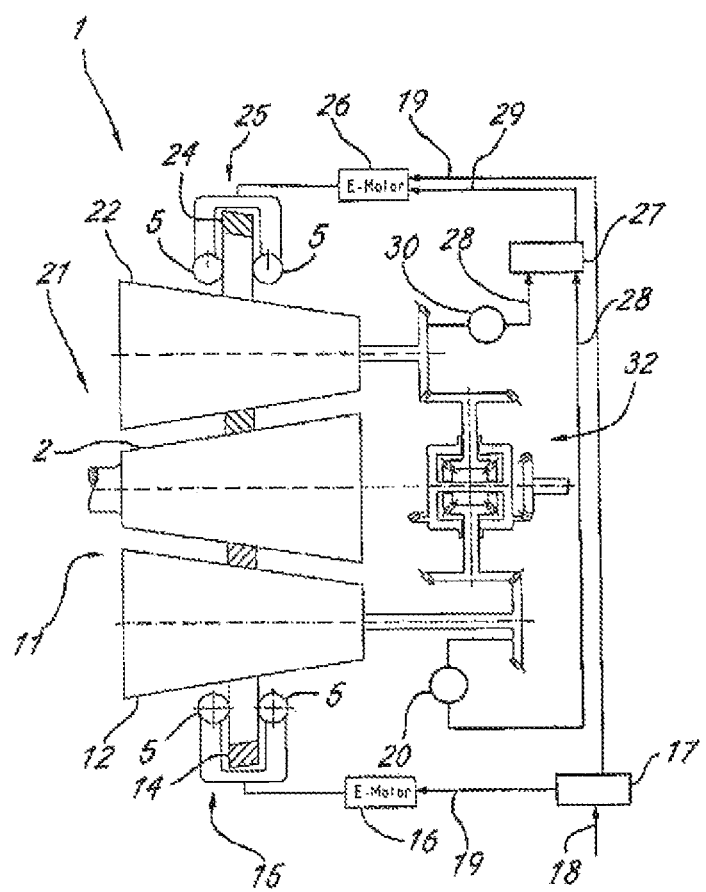
FIG. 3 a further cone/friction ring transmission having a first subsidiary transmission, having a second subsidiary transmission, and having a second power-split equalization transmission, which connects the further cones of the first subsidiary transmission and of the second subsidiary transmission so as to interact with a common shaft.

The cone/friction ring transmission shown in FIG. 3, having a first subsidiary transmission 11 and a second subsidiary transmission 21, has a second power-split equalization transmission 32, whereby this second power-split equalization transmission 32 represents a simplified embodiment of the first power-split equalization transmission 31 according to the exemplary embodiment from FIG. 2. For the purpose of reducing friction losses and assembly effort, multiple subsidiary transmissions and a direct gear connecting the common cone 2 with the common shaft 3, so as to interact, were eliminated, thereby resulting in a further possibility for increasing the degree of effectiveness of the transmission, by reducing friction losses. Regulation of the axial position of the friction rings 14, 24 shown in this exemplary embodiment once again uses two superimposed control variables 19, 29 of the two subsidiary regulation devices 17, 27 for regulation of the axial position of the friction ring of the second subsidiary transmission 24.

The second subsidiary regulation device 27 uses the speed of rotation difference of the further cones 12, 22 of the two subsidiary transmissions 11, 21 as the reference variable, at this point, instead of the speed of rotation difference of the friction rings 14, 24, for relative positioning of the friction ring of the second subsidiary transmission 24. Use of the second equalization transmission 32, which is subject to losses in the degree of effectiveness, preferably allows the use, in this embodiment, of the speed of rotation difference of the further cones 12, 22 for generating a second control variable 19 by means of the reference variable 28 that is made available, so that making the reference variable 28 available can take place by means of simple regulation variable detection 20, 30 fixed in place on the housing.

Figure 4:
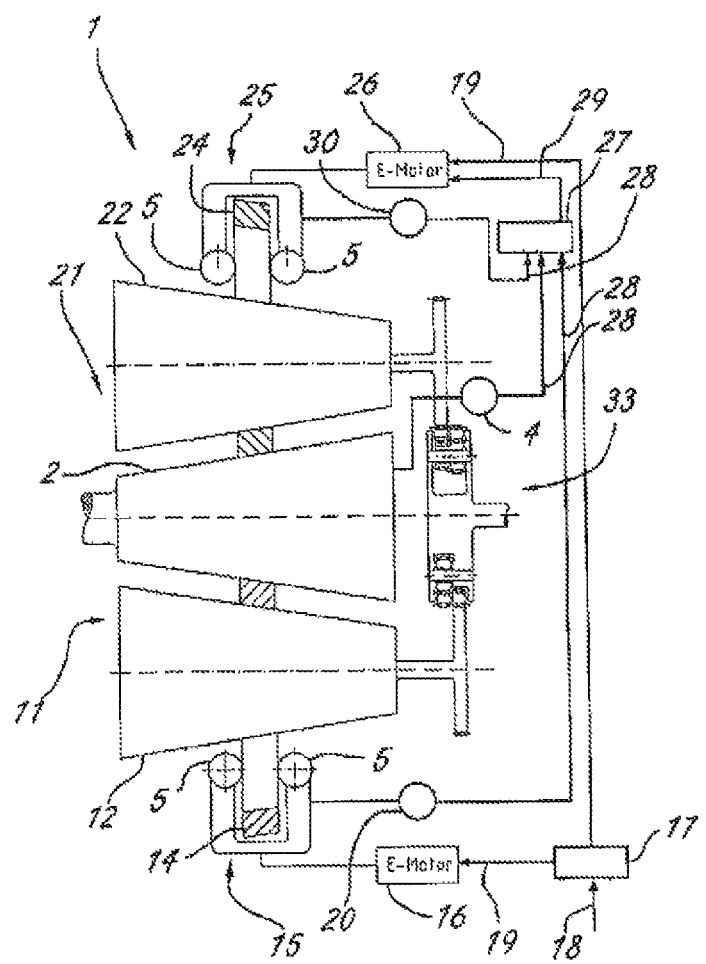
FIG. 4 a further cone/friction ring transmission having a first subsidiary transmission, having a second subsidiary transmission, and having a third power-split equalization transmission, which connects the further cones of the first subsidiary transmission and of the second subsidiary transmission so as to interact with a common shaft.

FIG. 4 shows a further exemplary embodiment of a cone/friction ring transmission 1, whereby a third power-split equalization transmission 33 is used, which is structured as a planetary gear and also is able to balance out differences in speed of rotation and torque between the first subsidiary transmission 11 and the second subsidiary transmission 21, and clearly reduces the construction space of the cone/friction ring transmission 1 in the axial direction, as compared with the exemplary embodiments having the first and second power-split equalization transmissions 31, 32 shown in FIGS. 2 and 3. The subsidiary regulation device 27 shown in this exemplary embodiment uses a second reference variable 28, which is generated from three speed of rotation signals, the speeds of rotation of the friction rings 14, 24 and the speed of rotation of the common cone 2, to make available the second control variable 29. Use of the speed of rotation signal of the common cone 2 made available by way of the speed of rotation sensor 4 makes it possible to draw conclusions concerning the slip that occurs in the friction rings 14, 24, by way of mathematical, physical and/or tribological models, so that instead of a speed of rotation signal, this determined slip can also be used as a reference variable 28 for regulation of the axial position of the friction ring of the second subsidiary transmission.

The use of an equalization transmission, such as the third power-split equalization transmission 33 used here, does effectively prevent the occurrence of different slip at the friction rings 14, 24, for which reason use of this regulation on further friction cones 12, 22 that are coupled in torsionally rigid manner is preferably preferred, but the present regulation strategy allows the use of a differential block in the power-split equalization transmissions 31, 32, 33, for example, which block prevents relative movements in the gear set of the equalization transmissions 31, 32, 33.

Figure 5:
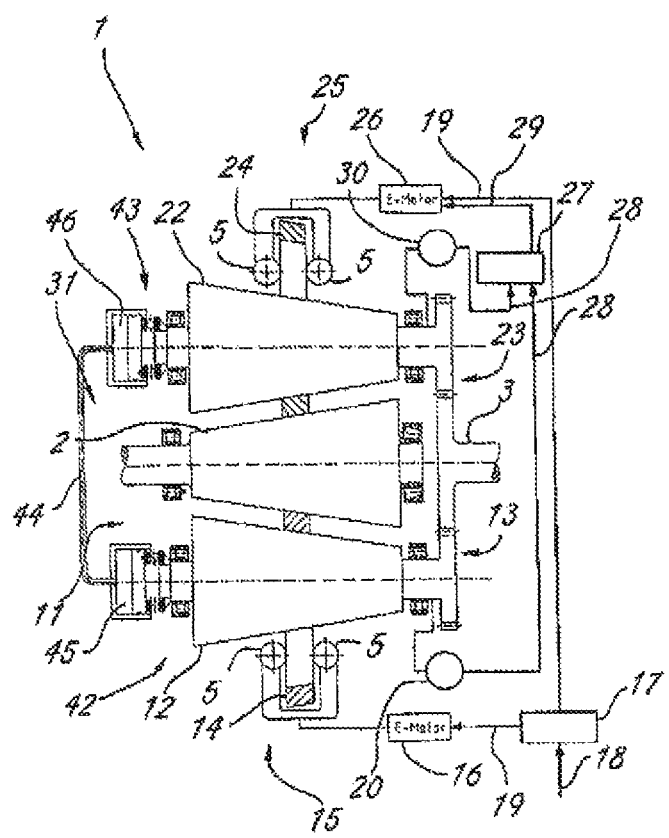
FIG. 5 a cone/friction ring transmission having a first subsidiary transmission, having a second subsidiary transmission, having a first press-down unit for a further cone of the first subsidiary transmission, having a second press-down unit for a further cone of the second subsidiary transmission, and having hydraulic force equalization between the first press-down unit as well as the second press-down unit.

In FIG. 5, a cone/friction ring transmission 1 according to the invention is shown, with a further cone 12 of the first subsidiary transmission 11, on which a first press-down unit 42 acts, and a further cone 22 of the second subsidiary transmission 21, on which a second press-down unit 43 acts.

The requirement of generating press-down forces that act in the same way in both subsidiary transmissions 11, 21 is taken into account, in this embodiment, by means of hydraulic equalization 44 disposed between the press-down units 42, 43.

The use of a regulation device according to the invention for axial positioning of the friction rings 14, 24, in this embodiment, requires essentially identical tribological conditions in the friction contacts between the friction rings 14, 24 and the cones 2, 12, 22 connected to interact by means of these friction rings 14, 24, particularly if the second subsidiary regulation device 27 regulates the axial position of the friction ring of the second subsidiary transmission 24 by way of measuring the speed of rotation of the friction rings 14, 24, or by way of measuring the slip that is present at the friction rings. In this connection, the hydraulic equalization 44 connects an oil-filled first pressure chamber 45 of the first press-down unit 42 with an also oil-filled second pressure chamber 46 of the second press-down unit 43. The oil contained in the press-down units 42, 43 can therefore flow back and forth between the pressure chambers 45, 46, so that the press-down forces on the further cones 12, 22 of the two subsidiary transmissions 11, 12 always assume the same value, and in this way, the tribological conditions at the friction contacts of the friction rings 14, 24 achieve the same state.

The further cones 12, 22 are mounted, on both sides, by means of radial bearings, and therefore are freely movable in the axial direction. All the axial forces, as well as the equalization forces of the press-down units 42, 43, are supported by a conical roller bearing situated on the common cone 2. Additional axial bearings between the press-down units 42, 43 and the further cones 12, 22 uncouple the rotational movement of the further cones 12, 22 from the press-down units 42, 43.

FIG. 5 furthermore shows an alternative regulation strategy for the second subsidiary regulation device. In this connection, the difference of the torques applied at the further cones 12, 22 measured by way of the regulation variable detection 20, 30 is used as the reference variable 28; this difference results from axial incorrect positioning of the friction rings 14, 24, because a reduction in the transferred power takes place by means of an increase in the slip in one of the friction rings 14, 24.

Figure 6:
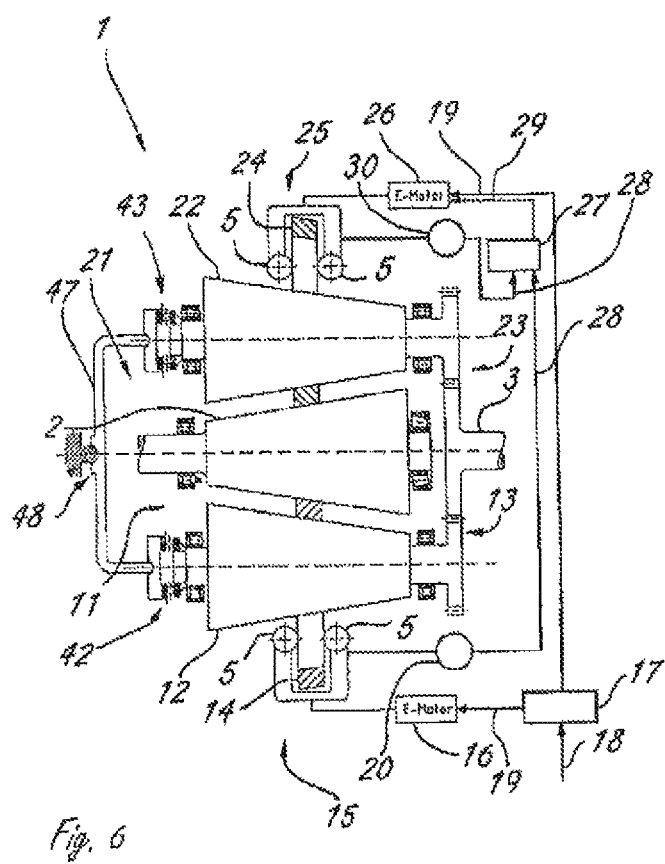
FIG. 6 a cone/friction ring transmission having a first subsidiary transmission, having a second subsidiary transmission, having a first press-down unit for a further cone of the first subsidiary transmission, having a second press-down unit for a further cone of the second subsidiary transmission, and having mechanical force equalization between the first press-down unit as well as the second press-down unit.

The embodiment shown in FIG. 6 comprises a correspondingly acting equalization of force between the first press-down unit 42 and the second press-down unit 43. In this embodiment, different press-down forces acting on the further cones 12, 22 are equalized by way of mechanical equalization 47. In this connection, the mechanical equalization 47 acts by way of a lever situated between the first subsidiary transmission 11 and the second subsidiary transmission 21, which is mounted so as to rotate in its pivot point 48, situated on its axis of symmetry, on the housing of the cone/friction ring transmission 1, so that the levers that act on the press-down units 42, 43 have the same active length and the press-down forces that act on the further cones 12, 22 always have the same value.

The cone/friction ring transmission 1 according to FIGS. 5 and 6 furthermore has a torque converter structured as a spur gear transmission having a first gear-wheel transmission 13 and a second gear-wheel transmission 23, in order to reduce a torque of the common shaft 3 before this torque is introduced into the further cone 12 of the first subsidiary transmission 11 and into the further cone 22 of the second subsidiary transmission 21. Along with the reduction in torque, the speed of rotation of the two further cones is increased in proportion to the reduction in torque, as is usual in the case of transmissions having a fixed transmission translation.

In contrast to an embodiment of a cone/friction ring transmission 1 having only one input cone and one output cone, the cone/friction ring transmission 1 according to the embodiment shown in FIG. 5 is now suitable for transferring four times the torque originally introduced. The first doubling of the transferred torque follows from the use of two input cones 12, 22, and, accompanying these, two subsidiary transmissions 11, 21, and the friction contacts therefore present twice between the input cones 12, 22 and the common output cone 2.

The second doubling of the transferred torque, thereby transferring four times the torque, follows from halving of the incoming torque, as explained above, with doubling of the speed of rotation. It is immediately evident that final adaptation of the torque that proceeds from the cone/friction ring transmission 1 can take place in a differential transmission that follows the cone/friction ring transmission 1. However, the said final adaptation of the outgoing torque does not necessarily have to be performed with the same factor as the input-side torque conversion by way of the gear-wheel transmissions 13, 23.

In the embodiment shown, cone-side gear wheels of the two gear-wheel transmissions, in each instance, have about half the diameter of a shaft-side gear wheel, disposed on the common shaft 3. However, the numbers of teeth of two gear wheels situated in engagement within a gear-wheel transmission do not correspond to precisely twice or half the number of teeth of the other gear wheel, in each instance. To produce a better wear profile, the number of teeth of one of the two gear wheels within a gear-wheel transmission 13, 23 is reduced or increased by one tooth. This embodiment brings about constantly different pairings of two teeth during engagement.

Figure 7:
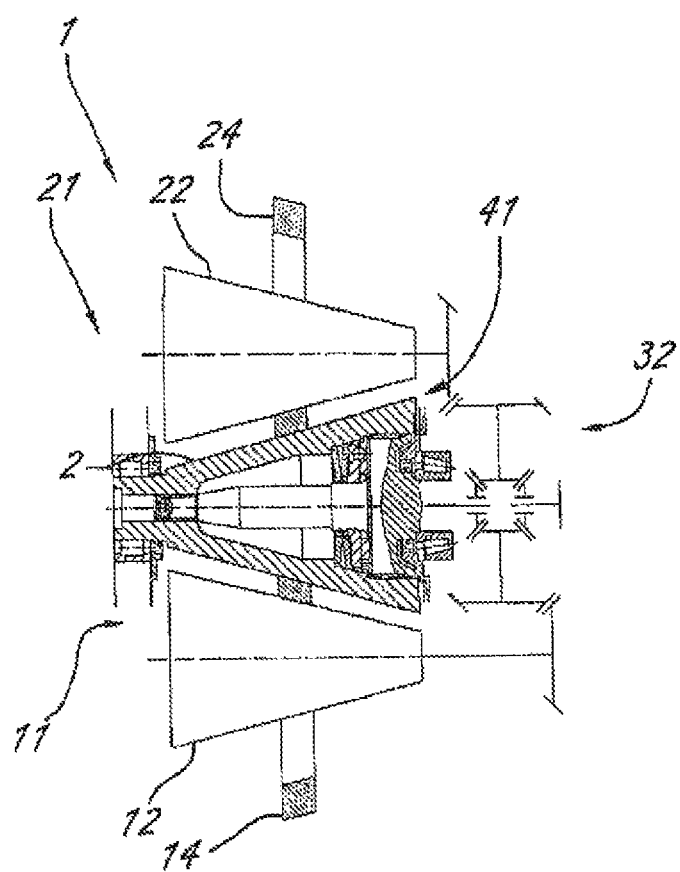
FIG. 7 a cone/friction ring transmission having a first subsidiary transmission, having a second subsidiary transmission, and having a common press-down unit situated on a common cone.

FIG. 7 shows a device for applying a press-down force between the friction rings 14, 24 and the cones 2, 12, 22, which can be used preferably supplementally but also alternatively to the press-down force equalizations according to FIGS. 5 and 6. In this connection, a common press-down unit 41 is used on the common cone 2, so that the press-down force required for the transfer of force between the cones 12, 22, in each instance, and the common cone 2 is applied by means of this single common press-down unit 41 and not by means of the use of two separate press-down units. The arrangement shown, with a common press-down unit 41, makes it possible to simplify the assembly of the cone/friction ring transmission 1 by means of the elimination of assembly-intensive modules. Furthermore, with this arrangement, the possibility is provided of structuring the press-down unit 41 itself, in terms of design, in such a manner that no further components are required for force equalization between the further cones 12, 22 of the two subsidiary transmissions 11, 21, because the press-down unit 41 already acts uniformly on both further cones 12, 22, without any further aids.

The press-down unit 41 applies a press-down force required for transfer of force, at least by way of two plate springs, not numbered, of a first subsidiary press-down device, whereby the press-down force is constant, at first, in the entire operating range of the cone/friction ring transmission 1. In addition to this constant basic load, the second subsidiary press-down unit shown, not numbered, can generate a torque-dependent press-down force by means of a roller body and a run-up ramp on which the roller body, also not numbered, rolls. Therefore the press-down unit 41 shown can advantageously be used in the case of greatly varying input torques. In particular, a torque can be measured, if necessary directly, by way of the press-down unit 41, and used for the regulation procedures described above, in that the displacement of the different modules of the press-down unit 41 is used to generate a corresponding measurement signal.

Figure 8:
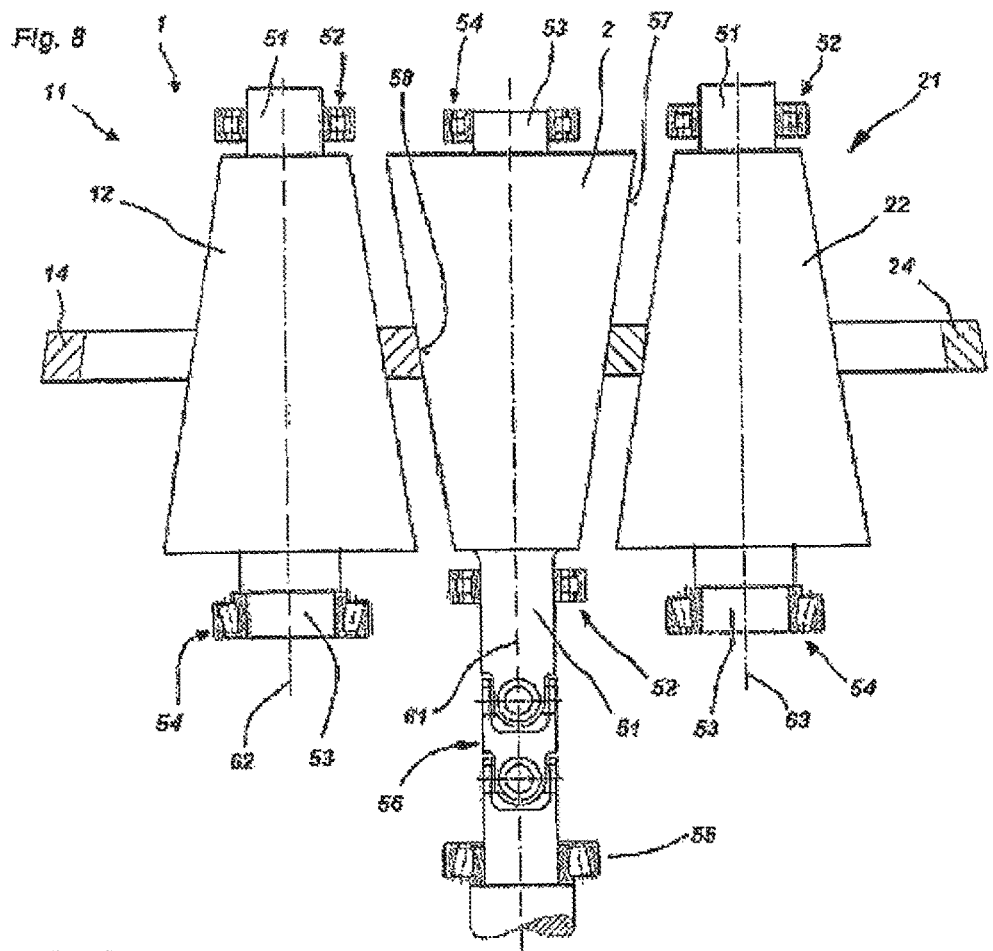
FIG. 8 a cone/friction ring transmission having a first subsidiary transmission, having a second subsidiary transmission, and having a common cone that is freely movable in an axis plane, which cone has two movable and torsionally rigid couplings on its shaft.

The cone/friction ring transmission 1 according to FIG. 8 has a shaft coupling 56 consisting of two universal joints, which follows displacement of the axis of rotation 61 of the common cone 2 and also makes these possible. The shaft 51 of the common cone 2 is connected with the shaft coupling 56, whereby this shaft 51 is mounted in the cone/friction ring transmission 1 by means of a shaft-side friction cone bearing 52. On the side of the common cone 2 that faces away from this shaft-side friction cone bearing 52, a shoulder-side friction cone bearing 54 is provided, which mounts the common cone 2 in a housing of the cone/friction ring transmission 1, at a shoulder 53. In similar manner, the two further cones 12, 22 are also mounted in the cone/friction ring transmission 1, whereby each of the two further cones 12, 22 has a shaft 51 and a shoulder 53, which are furthermore used for mounting, by means of the shaft-side friction cone bearing 52 and the shoulder-side friction cone bearing 54. The two further cones 12, 22 are enclosed by their friction ring 14, 24, in each instance, and transfer a torque to the common cone 2 by means of this friction ring 14, 24.

The two bearings of the common cone 2, the shaft-side friction cone bearing 52 and the shoulder-side friction cone bearing 54, form a floating bearing, in each instance, in this embodiment according to FIG. 8, thereby making it possible for axial shaft displacement to take place at any desired location along the axis of rotation 61 of the common cone 2. Clamping in the axial direction only takes place, seen from the common cone 2, behind the shaft coupling 56, on the guide bearing 55. In this exemplary embodiment, the guide bearing 55 is structured as a conical roller bearing, and supports the axial forces on a shoulder situated on the shaft 51. In. contrast to this, the two further cones 12, 22 of the two subsidiary transmissions 11, 21 have a fixed/floating mounting usual in the state of the art, with a conical roller bearing as the shoulder-side friction cone bearing 54, and a cylindrical roller bearing as the shaft-side friction cone bearing 52.

The exemplary embodiment according to FIG. 8 allows translational offset, particularly by means of the two floating bearings of the common cone 2, by means of its shaft-side friction cone bearing 52 and its shoulder-side friction cone bearing 54, and also rotational offset of the common cone 2, in that the two friction cone bearings 52, 54 of the cone 2 have a degree of freedom, in each instance, in the direction of the axes of rotation 62, 63 of the first further cone 12 and of the second further cone 22. In an exemplary embodiment that is not shown, however, it is also possible to do without the guide bearing 55 and to replace one of the two friction cone bearings 52, 54 with an angularly movable bearing, for example a spherical roller bearing or a self-aligning bail bearing. Such an exemplary embodiment allows mounting of the common cone 2 similar to the method known in the state of the art, whereby the translational freedom of movement of the other friction cone bearing, in each instance, of the floating bearing, is maintained by means of the angular mobility of the fixed bearing. In this regard, an exemplary embodiment having a rotationally movable bearing as a friction cone bearing makes available a common cone having only one degree of freedom, a rotational degree of freedom.

A common cone having two degrees of freedom, whereby the axis of rotation 61 of the common cone 2 can also be guided parallel to the two further axes of rotation 62, 63 of the first and of the second further cone, also always leads to parallelity of the cone surface 57 with cone surfaces of the two further cones 12, 22. In such an embodiment, as it is also shown in FIG. 8, a ring contact surface 58 of a friction ring 14, 24 of the first or of the second subsidiary transmission 11, 21 is equipped with a surface structured, at least in cross-section, as a straight line. This brings about linear contact between the ring contact surface 58 and the cone surface 57, as is immediately evident. If instead of a cone 2 having a floating/floating mounting, a common cone 2 having a fixed/floating mounting is used, then the common cone 2, as has already been explained above, has only one degree of freedom of rotation instead of one degree of freedom of rotation and an additional degree of freedom of translation. However, this restriction of the degrees of freedom of the common cone 2 leads to the result that the cone surface 57 can no longer be guided parallel to the surfaces of the further cones 12, 22. Consequently, it is problematical, in a certain sense, to also no longer structure the ring contact surface 58 of the two friction rings 14, 24 to be level, at least level in a cross-section. A ring contact surface that is structured to be crowned, in other words a contact surface that has a convex curvature at least in the axis plane, can balance out the angle offset of the common cone 2. In this connection, impermissibly high edge pressure at one of the two friction rings 14, 24 does not occur.

As is immediately evident, a cone/friction ring transmission structured according to FIG. 8, having a movable common cone 2, can also be structured in such a manner that the further cones 12, 22 or at least one of these further cones 12, 22 is structured as a movable cone. However, it is immediately evident that a movable common cone 2 is able to balance out non-uniform contact forces at the two friction rings 14, 24, by means of a press-down device applied in this common cone 2.

Figure 9:
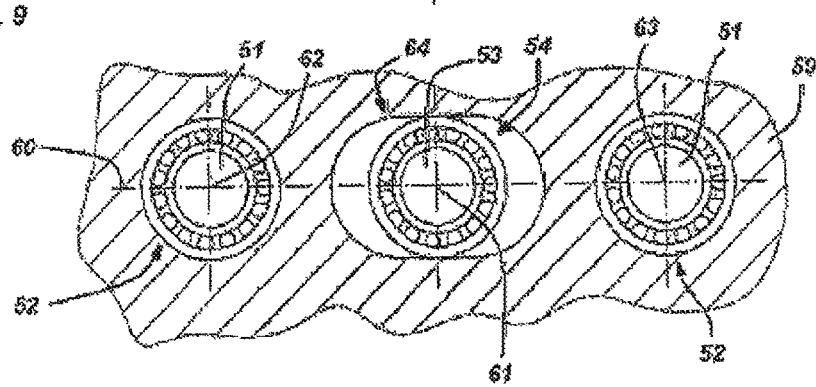
FIG. 9 the arrangement of the bearings and shafts shown in FIG. 8, in a top view.
Figure 10:
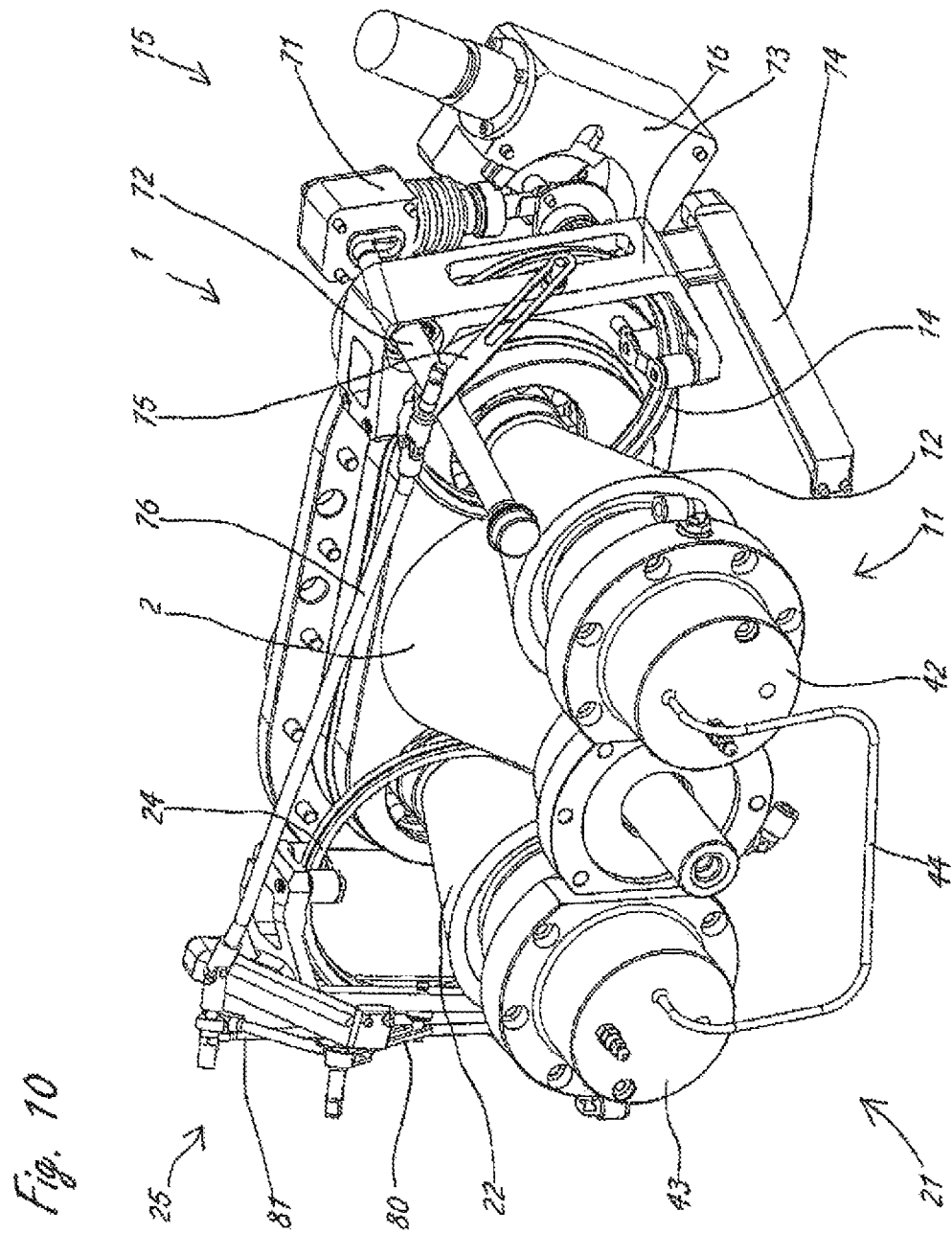
FIG. 10 a cone/friction ring transmission having a first subsidiary transmission, having a second subsidiary transmission, having mechanical coupling between the two transmissions, in a first perspective view, at a low translation ratio.
Figure 11:
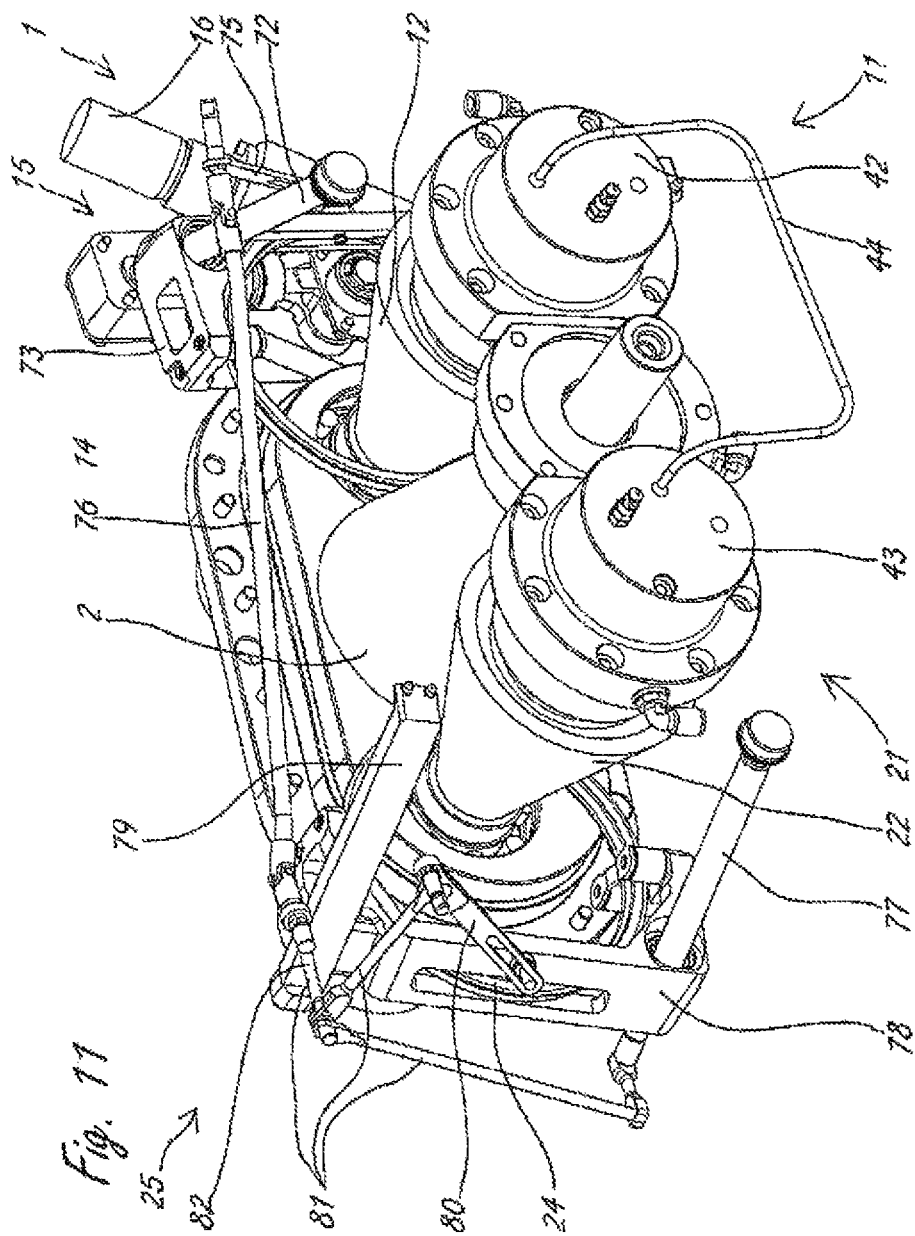
FIG. 11 the cone/friction ring transmission according to FIG. 10 in another perspective view.
Figure 12:
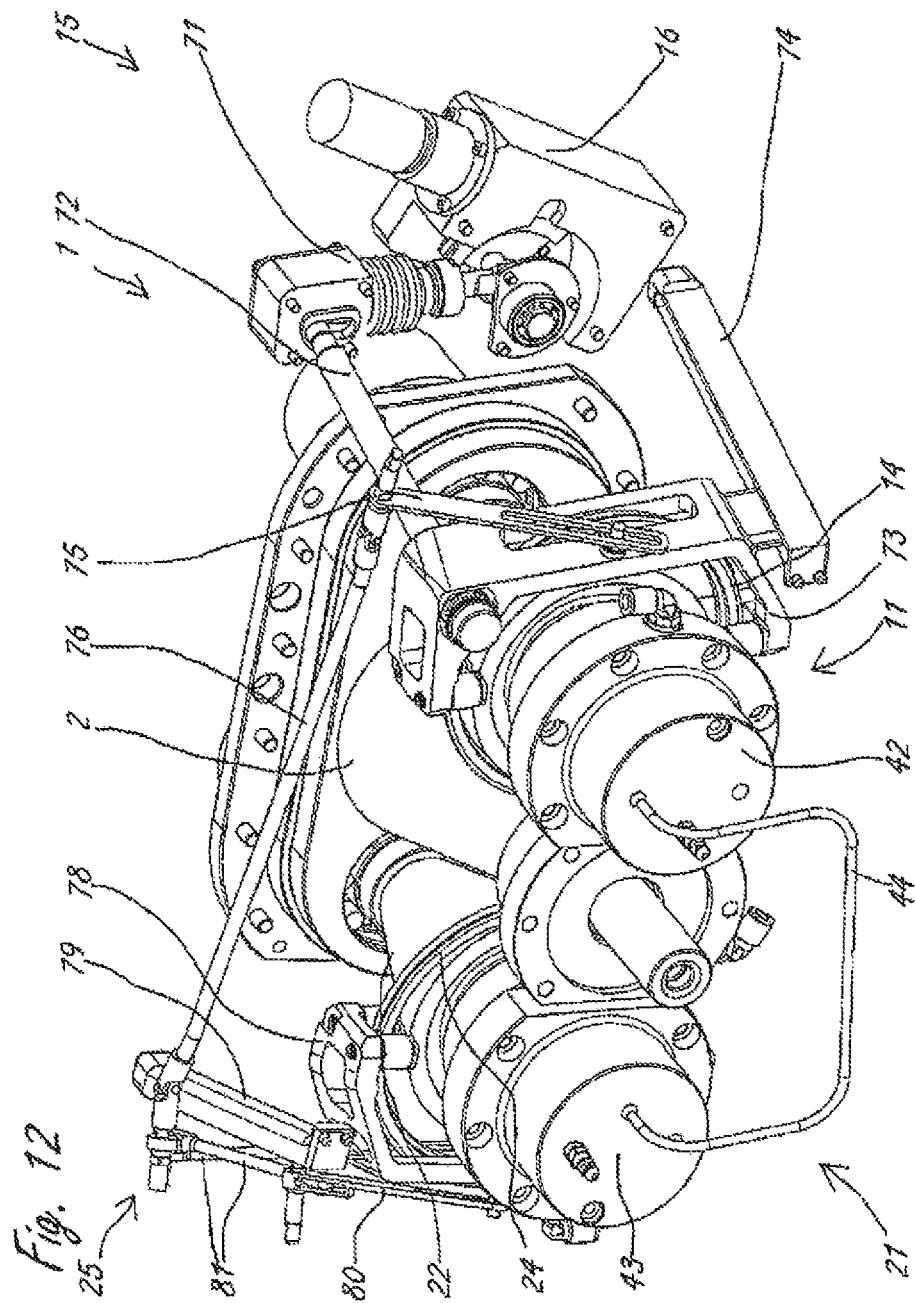
FIG. 12 the cone/friction ring transmission according to FIGS. 10 and 11 in a perspective view similar to FIG. 10, at a high translation ratio.
Figure 13:
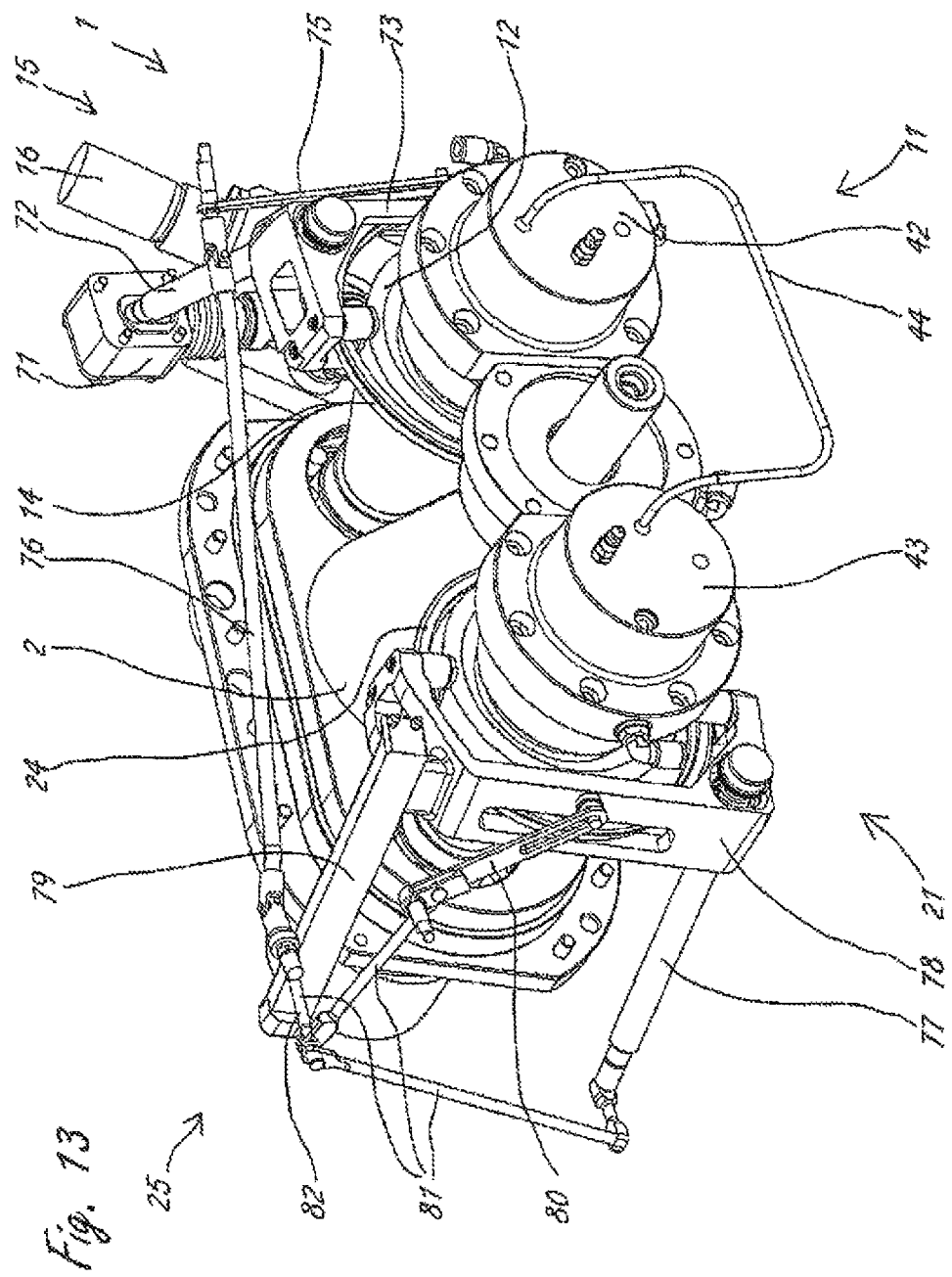
FIG. 13 the cone/friction ring transmission according to FIGS. 10 to 12 in a perspective view similar to FIG. 11, at a high translation ratio.
Figure 14:
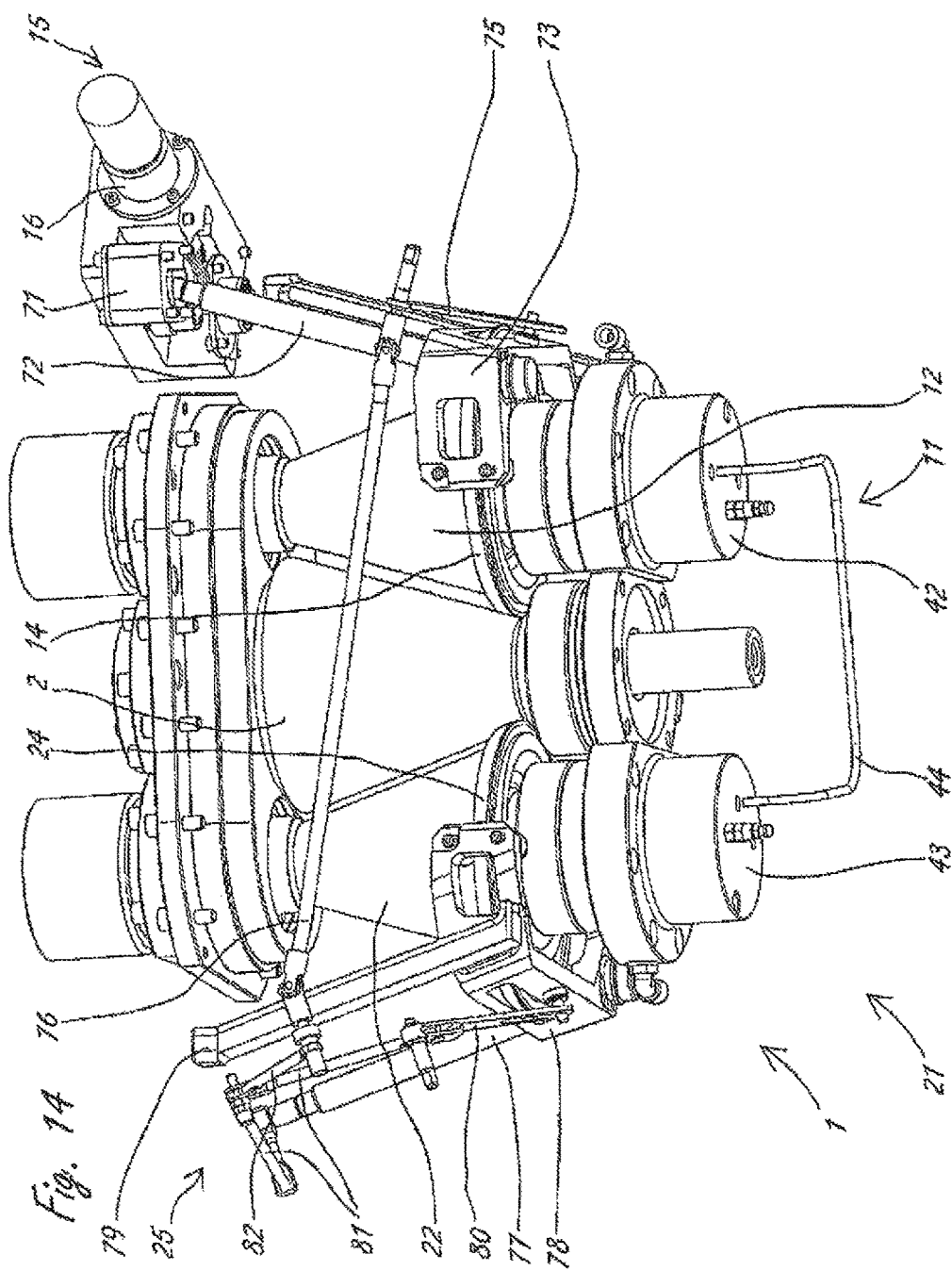
FIG. 14 the cone/friction ring transmission according to FIGS. 10 to 13 in a top view, at a high translation ratio.

The shoulder-side friction cone bearing 54 of the common cone 2 is disposed in a horizontally structured cone guide 64 according to FIG. 9. This guide 64 allows migration of the friction cone bearing, in this case of the shoulder-side friction cone bearing 54, along an axis plane 60, which is spanned by the axes of rotation 62, 63 of the two further cones 12, 22 and by the axis of rotation 61 of the common cone 2. The term "horizontal" refers, in this case, to a direction within the axis plane, whereby "vertical" would mean a movement direction perpendicular to the axis plane 60.

In the exemplary embodiment according to FIG. 9, the bearing guide 64 is structured as an oblong hole having an orientation relative to the axis plane 60. In this connection, it is also possible that the bearing guide 64 has an accommodation or socket for an outer ring of the shoulder-side friction cone bearing 54 and therefore the bearing guide 64 itself is disposed within a housing 59 of the cone/ring transmission 1, as a carriage. The use of a separate component as a carriage for a bearing guide 64 furthermore allows better clamping of the friction cone bearing used, in each instance, and uncoupling of the translational guidance of the common cone 2 within the axis plane 60 and the rotational mounting of the common cone 2 by means of the friction cone bearing, in each instance.

If a press-down device within the common cone 2 is eliminated, it is also possible, alternatively to the embodiment described above, that two friction cone bearings of the two further cones 12, 22 have a friction cone bearing guide 64, whereby in such an exemplary embodiment, these bearing guides 64 can also be equipped with press-down devices, in order to brace the two further cones 12, 22 in the direction of the common cone 2, by means of a force.

Instead of electronic control of the two adjustment devices 15, 25, control or regulation of the second subsidiary transmission 21 can also take place mechanically, as is explained as an example, using the exemplary embodiment shown in FIGS. 10 to 15. In this connection, control or regulation of the first subsidiary transmission 11 preferably takes place in known manner, so that here, known devices can be used, in particular. Thus, for example, the servomotor 16, by way of a transmission arrangement 71, can displace a case 72 at a work angle, which case in turn displaces the friction ring 14 in terms of its work angle, by way of an adjustment bridge 73, which is mounted in axially displaceable manner on this case and a rotation prevention device 74, so that this friction ring migrates accordingly, on its own and due to the rotation of the cones 2, 12. Alternatively, the case 72 can also be structured as a two-axle case or otherwise, as long as it accordingly guides the adjustment bridge axially and allows an angle adjustment. Likewise, the rotation prevention device 74 can also be implemented by means of a second guide rod or in the first guide rod of the case 72. Also, it is not absolutely necessary to configure the adjustment bridge 73 in the manner of a bridge, as long as it guarantees sufficiently stable guidance and angle adjustment.

In this exemplary embodiment, the position of the adjustment bridge 73 is transferred to the second adjustment device 25 by means of a transfer rod 76, by way of a mechanical position sensor 75, which can also be used for recording measurement values, if necessary, by way of a potentiometer.

The second adjustment device 25 also has a case 77 that mounts an adjustment bridge 78 in axially displaceable manner, by means of a rotation prevention device 79, in known manner, and allows angle adjustment of the friction ring 24 mounted by the adjustment bridge 78 and allows the adjustment bridge 78 to freely follow axial migration of the friction ring 24. However, the case 77 is controlled by way of a feedback linkage 81, which encloses the position sensor 80, on the one hand, and the control rod 82, on the other hand, and is oriented in such a manner that an axial position of the friction ring 24 can be preset by way of the control rod 82, which position is then approached, under the control of the position sensor 80, by means of mechanical feedback of the feedback linkage 81.

In this connection, the transfer rod 76 is coupled with the control rod 82, so that the mechanically determined position of the adjustment bridge 73 and therefore of the friction ring 14 serves as a reference variable of the second adjustment device 25.

For the remainder, modules of the exemplary embodiment shown in FIGS. 10 to 14 that act in identical manner are also identically numbered, so that in order to avoid repetitions, they will not be described again here, and reference is made to the above explanations.

In this connection, the adjustment devices 15, 25 do not necessarily have to be provided on the side of the cones 12, 22 that faces away from the cone 2, in each instance. Instead, it is possible to provide the adjustment devices 15, 25 above or below the cones 2, 12, 22, which are essentially disposed in one plane, as is shown as an example in FIG. 15. In this way, mechanical coupling can be significantly simplified, if applicable.

Figure 15:
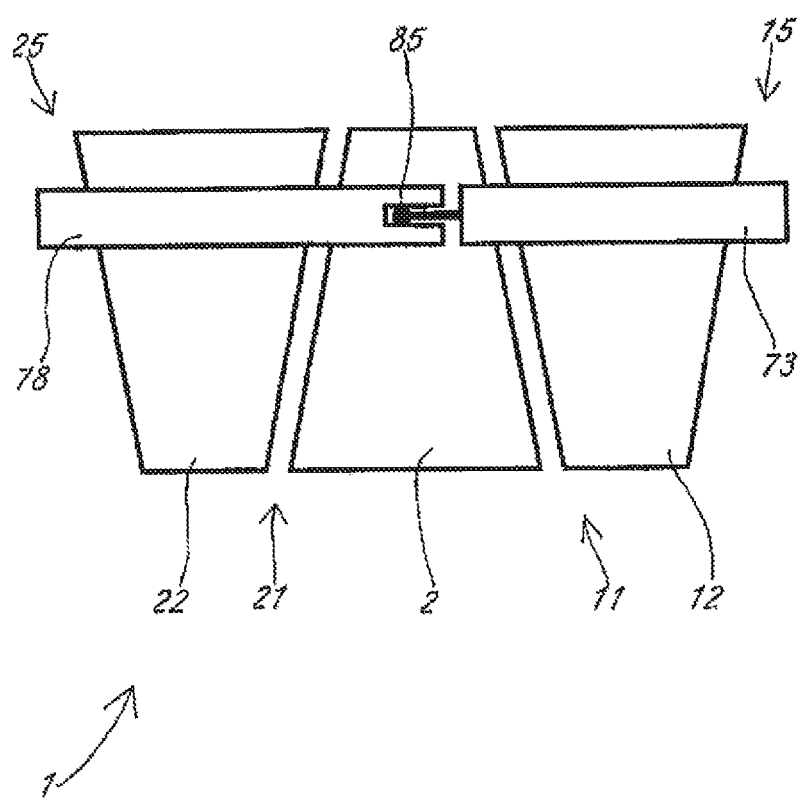
FIG. 15 a schematic top view of another cone/friction ring transmission.

In the exemplary embodiment shown in FIG. 15, mechanical coupling of the two adjustment devices 15, 25 is accordingly also provided, whereby the adjustment bridge 73 of the adjustment device 15 is regulated in known manner, while the adjustment bridge 78 of the adjustment device 25 is configured as a following adjustment device, in that a case of the adjustment device 25, not shown, allows axial displacement of the adjustment bridge 78 in the manner already described above, but in deviation from the exemplary embodiment described above, does not preset an angular position, but rather can freely follow an angular position preset by the adjustment bridge 78.

By means of a rotational/sliding connection 85 between the two adjustment bridges 73, 78, the adjustment bridge 78 is tilted if it has an axial position that deviates from the axial position of the adjustment bridge 73. The case of the adjustment device 25 follows this tilting accordingly, as has been described above, so that the friction ring can migrate in accordance with the angular position, until the angle has been regulated back to zero. Therefore if the adjustment bridge 73 is displaced, the adjustment bridge 78 or the corresponding friction ring follows this displacement.

In this exemplary embodiment, the rotational/sliding connection 85 is formed by a groove in the adjustment bridge 78, into which a round tongue of the adjustment bridge 73 engages. Fundamentally, such an arrangement of an elongated groove and a round motion link makes it possible to implement a rotational/sliding connection in almost any desired manner, whereby ultimately, even more complex couplings, up to the coupling corresponding to the exemplary embodiment described above, are possible.

REFERENCE SYMBOL LIST

1 cone/friction ring transmission
2 common cone
3 common shaft
4 speed of rotation sensor
5 small guide wheel
11 first subsidiary transmission
12 further cone of the first subsidiary transmission
13 first gear-wheel transmission
14 friction ring of the first subsidiary transmission
15 adjustment device of the friction ring of the first subsidiary transmission
16 first servomotor 17 first subsidiary regulation device
18 first reference variable
19 first control variable
20 first regulation variable detection
21 second subsidiary transmission
22 further cone of the second subsidiary transmission
23 second gear wheel mechanism
24 friction ring of the second subsidiary transmission
25 adjustment device of the friction ring of the second subsidiary transmission
26 second servomotor
27 second subsidiary regulation device
28 second reference variable
29 second control variable
30 second regulation variable detection
31 first power-split equalization transmission
32 second power-split equalization transmission
33 third power-split equalization transmission
41 common press-down unit
42 first press-down unit
43 second press-down unit
44 hydraulic force equalization
45 first pressure chamber
46 second pressure chamber
47 mechanical force equalization
48 pivot point
51 shaft
52 shaft-side friction cone bearing
53 shoulder
54 shoulder-side friction cone bearing
55 guide bearing
56 shaft coupling
57 cone surface
58 ring contact surface
59 housing
60 axis plane
61 axis of rotation of the common cone
62 axis of rotation of the first further cone
63 axis of rotation of the second further cone
64 bearing guide
71 transmission arrangement
72 case
73 adjustment bridge
74 rotation prevention device
75 position sensor
76 transfer rod
77 case
78 adjustment bridge
79 rotation prevention device
80 position sensor
81 feedback linkage
82 control rod
83 rotational/sliding connection

What is claimed is:

1. Cone/friction ring transmission comprising at least first and second subsidiary transmissions structured as cone/friction ring transmissions, which comprise a common cone and first and second further cones for the first and second subsidiary transmissions, respectively, and which have a first adjustment device for a friction ring of the first subsidiary transmission, and a second adjustment device for a friction ring of the second subsidiary transmission, wherein the first further cone of the first subsidiary transmission is connected to interact with a shaft, via a first transmission, and the second further cone of the second subsidiary transmission is connected to interact with said shaft, via a second transmission, wherein said first and second transmissions have an identical translation ratio or the first further cone of the first subsidiary transmission and the second further cone of the second subsidiary transmission are connected with a common shaft, with synchronous speeds of rotation, and wherein the cone/friction ring transmission has a regulation device for regulation of an axial position of the friction rings, wherein the regulation device has at least a first subsidiary regulation device having a first reference variable, and a second subsidiary regulation device having a second reference variable, which is separate from the first reference variable, and wherein the first subsidiary transmission has the first subsidiary regulation device for regulation of the position of the friction ring of the first subsidiary transmission, and the second subsidiary transmission has at least the second subsidiary regulation device for regulation of the position of the friction ring of the second subsidiary transmission; and wherein a regulation variable of the first subsidiary regulation device is said second reference variable of the second subsidiary regulation device; and wherein said first reference variable of the first subsidiary regulation device is not a reference variable of the second subsidiary regulation device.

2. Cone/friction ring transmission according to claim 1, wherein the reference variable of the second subsidiary regulation device is a reference variable of the first subsidiary regulation device, corrected by way of a position offset characteristic field.

3. Cone/friction ring transmission comprising at least two subsidiary transmissions structured as cone/friction ring transmissions, wherein the subsidiary transmissions have an input cone and a common output cone, in each instance, according to claim 1, wherein the common output cone has a press-down device.

4. Cone/friction ring transmission comprising at least one input cone and one output cone, and a friction ring disposed between the input cone and the output cone, enclosing at least one cone, according to claim 1, wherein the cone/friction ring transmission has a device for measuring the speed of rotation of the friction ring.

5. Cone/friction ring transmission according to claim 4, wherein the device for measuring the speed of rotation of the friction ring detects the speed of rotation of the friction ring directly on the friction ring.

6. Cone/friction ring transmission according to claim 5, further comprising a guide device that is axially displaceable with the friction ring, on which the measurement device is disposed.

7. Cone/friction ring transmission comprising at least one input cone and one output cone and a friction ring disposed between the input cone and the output cone, enclosing at least one cone, according to claim 1, further comprising a torque measurement device.

8. Cone/friction ring transmission comprising at least one input cone and one output cone and a friction ring disposed between the input cone and the output cone, enclosing at least one cone, according to claim 1, wherein a torque converter is disposed between an input shaft of the cone/friction ring transmission and the input cone.

9. Cone/friction ring transmission according to claim 8, wherein the input cone has a lower torque than the input shaft.

10. Cone/friction ring transmission according to claim 8, wherein the input cone has approximately half the torque of the input shaft.

11. Cone/friction ring transmission according to claim 8, wherein the torque converter comprises a gear wheel transmission.

12. Cone/friction ring transmission according to claim 11, wherein an input-side gear wheel of the gear-wheel transmission has an even number of teeth, and an output-side gear wheel of the gear-wheel transmission has an odd number of teeth, or wherein the input-side gear wheel of the gear-wheel transmission has an odd number of teeth, and the output-side gear wheel of the gear-wheel transmission has an even number of teeth.

13. Cone/friction ring transmission comprising at least a first subsidiary transmission structured as a cone/friction ring transmission and a second subsidiary transmission structured as a cone/friction ring transmission, according to claim 1, wherein at least two cones from different subsidiary transmissions have a press-down device, in each instance, and wherein the two press-down devices have a device for equalizing the difference in the press-down forces.

14. Cone/friction ring transmission comprising a first subsidiary transmission structured as a cone/friction ring transmission and a second subsidiary transmission structured as a cone/friction ring transmission, wherein the two subsidiary transmissions have a common cone, and the first subsidiary transmission has a first further cone and the second subsidiary transmission has a second further cone, wherein the axes of rotation of the common cone as well as of the two further cones are disposed in an axis plane, wherein at least the common cone has a shaft-side friction cone bearing as well as a shoulder-side friction cone bearing, according to claim 1, and wherein the shaft-side friction cone bearing and/or the shoulder-side friction cone bearing have a degree of freedom of translation along the axis plane.

15. Method for a cone/friction ring transmission comprising at least one input cone and one output cone and a friction ring disposed between the input cone and the output cone, enclosing at least one cone, according to claim 1, wherein a torque of the input cone is converted to a lower torque, with reference to an input shaft of the cone/friction ring transmission.

16. Method according to claim 15, wherein the torque of the input cone is converted to approximately half the torque of the input shaft.

17. Method for a cone/friction ring transmission having at least two subsidiary transmissions structured as cone/friction ring transmissions, which have a first adjustment device for a friction ring of the first subsidiary transmission and a second adjustment device for a friction ring of the second subsidiary transmission, wherein an axial position of the friction rings is regulated by way of a regulation device, wherein the regulation device has at least a first subsidiary regulation device having a first reference variable and a second subsidiary regulation device having a second reference variable, separate from the first reference variable, wherein the position of the friction ring of the first subsidiary transmission is regulated by way of the first subsidiary regulation device, and the position of the friction ring of the second subsidiary transmission is regulated by way of the second subsidiary regulation device.

18. Method for a cone/friction ring transmission having at least two subsidiary transmissions structured as cone/friction ring transmissions, which have a first adjustment device for a friction ring of the first subsidiary transmission and a second adjustment device for a friction ring of the second subsidiary transmission, wherein an axial position of the friction rings is regulated by way of a regulation device, wherein the regulation device has at least a first subsidiary regulation device having a first reference variable and a second subsidiary regulation device having a second reference variable, dependent on the first reference variable, wherein the second reference variable is generated by way of correction of the first reference variable by way of a position offset characteristic field, and the position offset characteristic field is generated via a calibration measurement of deviations in the axial position of the first and of the second friction ring.

19. Method for a cone/friction ring transmission according to claim 18, wherein the calibration measurement takes place before initial startup of the cone/friction ring transmission.

* * * * *